[US010570288B2](#)

United States Patent
Comstock et al.

(10) Patent No.: US 10,570,288 B2
(45) Date of Patent: Feb. 25, 2020

(54) RED AND RED-SHADE VIOLET INORGANIC OXIDE MATERIALS CONTAINING COBALT

(71) Applicant: The Shepherd Color Company, Cincinnati, OH (US)

(72) Inventors: Matthew C. Comstock, Fairfield, OH (US); Andrew E. Smith, Terrace Park, OH (US)

(73) Assignee: The Shepherd Color Company, Cincinnati, OH (US)

( * ) Notice: Subject to any disclaimer, the term of this patent is extended or adjusted under 35 U.S.C. 154(b) by 449 days.

(21) Appl. No.: 15/299,661

(22) Filed: Oct. 21, 2016

(65) Prior Publication Data

US 2017/0114224 A1  Apr. 27, 2017

Related U.S. Application Data

(60) Provisional application No. 62/245,377, filed on Oct. 23, 2015.

(51) Int. Cl.
| | |
|---|---|
| *C09C 1/36* | (2006.01) |
| *C04B 35/505* | (2006.01) |
| *C04B 35/64* | (2006.01) |
| *C03C 8/20* | (2006.01) |
| *C01G 51/00* | (2006.01) |
| *C09C 1/00* | (2006.01) |

(52) U.S. Cl.
CPC ............... *C09C 1/36* (2013.01); *C01G 51/70* (2013.01); *C03C 8/20* (2013.01); *C04B 35/505* (2013.01); *C04B 35/64* (2013.01); *C09C 1/00* (2013.01); *C01P 2002/34* (2013.01); *C01P 2002/80* (2013.01); *C01P 2006/62* (2013.01); *C01P 2006/63* (2013.01); *C01P 2006/64* (2013.01); *C01P 2006/65* (2013.01); *C01P 2006/66* (2013.01); *C01P 2006/90* (2013.01); *C03C 2207/00* (2013.01); *C04B 2235/3225* (2013.01); *C04B 2235/3234* (2013.01); *C04B 2235/3268* (2013.01); *C04B 2235/3275* (2013.01); *C04B 2235/3284* (2013.01); *C04B 2235/3286* (2013.01); *C04B 2235/658* (2013.01); *C04B 2235/768* (2013.01); *C04B 2235/9661* (2013.01)

(58) Field of Classification Search
CPC .. C09C 1/36; C09C 1/00; C01G 51/70; C03C 8/20; C03C 2207/00; C04B 35/505; C04B 35/64; C04B 2235/3225; C04B 2235/3286; C04B 2235/658; C04B 2235/9661; C01P 2002/34; C01P 2006/62; C01P 2006/63; C01P 2006/64; C01P 2006/65; C01P 2006/66; C01P 2006/90
See application file for complete search history.

(56) References Cited

U.S. PATENT DOCUMENTS

| | | | | |
|---|---|---|---|---|
| 3,793,046 A | * | 2/1974 | Wanmaker | ............ C09C 1/0003 106/461 |
| 6,541,112 B1 | | 4/2003 | Swiler et al. | |
| 6,582,814 B2 | | 6/2003 | Swiler et al. | |
| 8,282,728 B2 | * | 10/2012 | Subramanian | ........... C01G 1/02 106/31.13 |
| 2004/0152586 A1 | * | 8/2004 | Ou | ........................ B01J 23/002 502/64 |
| 2010/0317503 A1 | * | 12/2010 | Subramanian | ........... C01G 1/02 501/42 |
| 2013/0288042 A1 | * | 10/2013 | Haines | .................... C09D 5/004 428/334 |
| 2016/0026100 A1 | * | 1/2016 | Latchman | ............ G03G 9/0802 430/137.18 |

FOREIGN PATENT DOCUMENTS

| | | | | |
|---|---|---|---|---|
| CN | 1315920 A | | 10/2001 | |
| WO | WO 00/03947 | * | 1/2000 | ............. C01B 13/32 |
| WO | WO 2015/131036 A1 | | 9/2015 | |

OTHER PUBLICATIONS

Ahmadi, S., et al. "Synthesis of Y(Al,Cr)O3 red pigments by co-precipitation method and their interactions with glazes," Ceramics International, Elsevier, Amsterdam, NL, Dec. 1, 2009, 35(8):3485-3488, XP026641010, 4 pgs.
Anderson, J.B., et al., "The Crystal Structure of Cobalt Orthophosphate Co$_3$(PO$_4$)$_2$," Journal of Solid State Chemistry, 1975, 14:372-377, 6 pgs.
Gutierrez, D., et al., "Electrical and magnetic features in the perovskite-type system Y(Co, Mn)O$_3$," Journal of Physics and Chemistry of Solids, 2002, 63:1975-1982, 8 pgs.
Hunault, M., et al., "Spectroscopic properties of five-coordinated Co$^{2+}$ in phosphates," Spectrochimica Acta Part A: Molecular and Biomolecular Spectroscopy, 2014, 117:406-412, 7 pgs.
Jiang, P., et al., "New Oxides Showing an Intense Orange Color Cased on Fe$^{3+}$ in Trigonal-Bipyramidal Coordination," Inorg Chem, 2011, 50:5858-5860, 3 pgs.
Le, S-N, et al., "Energetics of cobalt phosphate frameworks: α, β, and red NaCoPO$_4$," Journal of Solid State Chemistry, 2006, 179:3731-3738, 8 pgs.
Mizoguchi, H., et al., "New Oxides Showing an Intense Blue Color Based on Mn$^{3+}$ in Trigonal-Bipyramidal Coordination," Inorg Chem, 2011, 50(1):10-12, 3pgs.
Moure, C., et al., "Structural Characterization of Y Me$_x$Mn$_{1-x}$O$_3$ (Me = Cu, Ni, Co) Perovskites," Journal of Solid State Chemistry, 2002, 163:377-284, 9 pgs.
Ocana, M. et al., "Synthesis, through pyrolysis of aerosols, of Yin$_{1-x}$Mn$_x$O$_3$ blue pigments and their efficiency for colouring glazes," Dyes and Pigments, 2011, 91:501-507, 7 pgs.

(Continued)

*Primary Examiner* — Pegah Parvini
(74) *Attorney, Agent, or Firm* — Frost Brown Todd LLC

(57) ABSTRACT

The current technology is directed to red and red-shade violet pigments with an hexagonal ABO$_3$ structure of the form Y(In, M)O$_3$ in which M is substituted for In in the trigonal bipyramidal B site of the ABO$_3$ structure, and where M is a mixture containing Co$^{2+}$ and charge compensating ions, or M is a mixture containing Co$^{2+}$ and charge compensating ions, as well as other aliovalent and isovalent ions.

11 Claims, 5 Drawing Sheets

(56) References Cited

OTHER PUBLICATIONS

Smith, A.E., et al., "$Mn^{3+}$ in Trigonal Bipyramidal Coordination: A New Blue Chromophere," J Am Chem Soc, 2006, 131:17084-17086, 3 pgs.

Smith, A.E., et al., "Synthesis and properties of solid solutions of hexagonal $YCu_{0.5}Ti_{0.5}O_3$ with $TMO_3$ (M = Mn, Cr, Fe, Al, Ga, and In)," Materials Research Bulletin, Jan. 2011, 46(1):1-5, 5 pgs.

Tamilarasan, S., et al., "Exploring the Colour of 3d Transition-Metal Ions in Trigonal Bipyramidal Coordination: Identification of Purple-Blue ($CoO_5$) and Beige-Red ($NiO_5$) Chromophores in $LiMgBO_3$ Host," European Journal of Inorganic Chemistry, 2016, pp. 288-293, 6 pgs.

International Search Report and Written Opinion dated Dec. 7, 2016 for Application No. PCT/US2016/058063, 11 pgs.

Grajczyk, Rosa, and M. A. Subramanian. "Structure—property relationships of YbFe2O4—and Yb2Fe3O7—type layered oxides: A bird's eye view." Progress in Solid State Chemistry 43.1-2 (2015): 37-46

\* cited by examiner

US 10,570,288 B2

RED AND RED-SHADE VIOLET INORGANIC OXIDE MATERIALS CONTAINING COBALT

BACKGROUND

Red and violet pigments that are free of regulatory concerns and that are stable in the preparation of colored glass are either highly expensive, such as the gold-bearing "Purple of Cassius," or dull, such as $Fe_2O_3$ red, or mixtures of $CoAl_2O_4$ blue and $Fe_2O_3$ red. The violet cobalt-containing phosphate pigments, $Co_3(PO_4)_2$ (PV14) and $(NH_4)CoPO_4$ (PV49) are not stable in high temperature applications, much less in glass. In contrast, the magenta Y(Co,Ti,In)$O_3$ pigment provides a blue-shade red pigment that is stable to at least 650° C. in glass enamel applications.

BRIEF SUMMARY

The primary chemistry is a cobalt and titanium substituted yttrium indium oxide of the form $Y(Co_xTi_xIn_{1-2x})O_3$ exhibiting a red to magenta color. The color of the primary technology is thought to result from incorporation of divalent cobalt in a trigonal bipyramidal coordination environment. Additional aspects of the technology include the incorporation of cobalt in concert with additional metal substitution to provide other color shades.

Another aspect of the technology is an $ABO_3$ hexagonal structured material which is a red-shade violet pigment having a formula A(M,M')$O_3$, wherein A is Y, La, Sc, Gd, Tb, Dy, Ho, Er, Tm, Yb, Lu, or mixtures thereof; wherein M=Al, Ga, In, Cr, Fe, Ni, B, Mn, or mixtures thereof; wherein M' is a mixture of $M_A$ and $M_B$ cations; wherein $M_A$=Co, Zn, Mg, Ca, Sr, Ba, Cu, Ni, or mixtures thereof; wherein $M_B$=Ti, Zr, Sn, Si, V, Sb, Nb, Mo, W, Ta, Bi or mixtures thereof; wherein at least one of $M_A$ is Co; wherein cations are present in proportions close to those for making an electrically neutral hexagonal oxide. The material may further be defined by the following formulas: Y(In, M')$O_3$; $YIn_{1-x}(Co_{0.5}Ti_{0.5})_xO_3$; $YIn_{1-x}((Co,Zn)_{0.5}Ti_{0.5})xO_3$, Y(In, Mn)$_{1-x}(Co_{0.5}Ti_{0.5})xO_3$; and Y(In, Mn)$_{1-x}((Co,Zn)_{0.5}Ti_{0.5})_xO_3$, wherein 0<x≤1.

In general, M and M' are in in a trigonal bipyramidal B site of the $ABO_3$ structure. M' may be a mixture containing $Co^{2+}$ and cations are present in proportions close to those for making the electrically neutral hexagonal oxide form. M may be In in a trigonal bipyramidal B site of the A(M,M')$O_3$ structure. Further, the material may have a hexagonal $ABO_3$ structure of the form $YInO_3$, with $In^{3+}$ in the trigonal bipyramidal B site. This material may be used as a pigment in paint, ink, glass, enamel, glaze, plastic or decorative cosmetic.

The present technology may also be defined as a material having a formula AMM'$O_4$ wherein A is Sc, Y, Gd, Tb, Dy, Ho, Er, Tm, Yb, Lu, In, Ga or mixtures thereof; wherein M is Al, Ga, In, Cr, Fe, Ni, B, Mn, Ti, Zr, Sn, Si, V, Sb, Nb, Mo, W, Ta, Bi or mixtures thereof; wherein M' is Co, Zn, Mg, Cu, Ni, or mixtures thereof; wherein at least one of M' is Co and where Co is present in a trigonal bipyramidal site in the AMM'$_4$ structure; Cations may be present in proportions close to those for making an electrically neutral hexagonal oxide. The material may be further defined as having the $YbFe_2O_4$ structure with a formula of the form AMM'$O_4$. This material may also be used as a pigment in paint, ink, glass, enamel, glaze, plastic or decorative cosmetic. In addition, M or M' may be a mixture containing $Co^{2+}$ where cations are present in proportions close to those for making an electrically neutral hexagonal oxide.

Compounds of the formulae AMM'$O_4$ and A(M,M')$O_3$ may be prepared using the step of heating a reaction mixture under vacuum, in air, or in an inert atmosphere comprising nitrogen, argon, and a mixture thereof. Synthetic steps may further comprise treating the reaction mixture with a reducing substance selected from silicon, silicon monoxide, carbon, antimony (III) oxide, and cobalt metal, comminuting the reaction mixture, washing the reaction mixture with water, acid, base, or a solvent, and use of one or more mineralizers.

DETAILED DESCRIPTION

Figure 1:
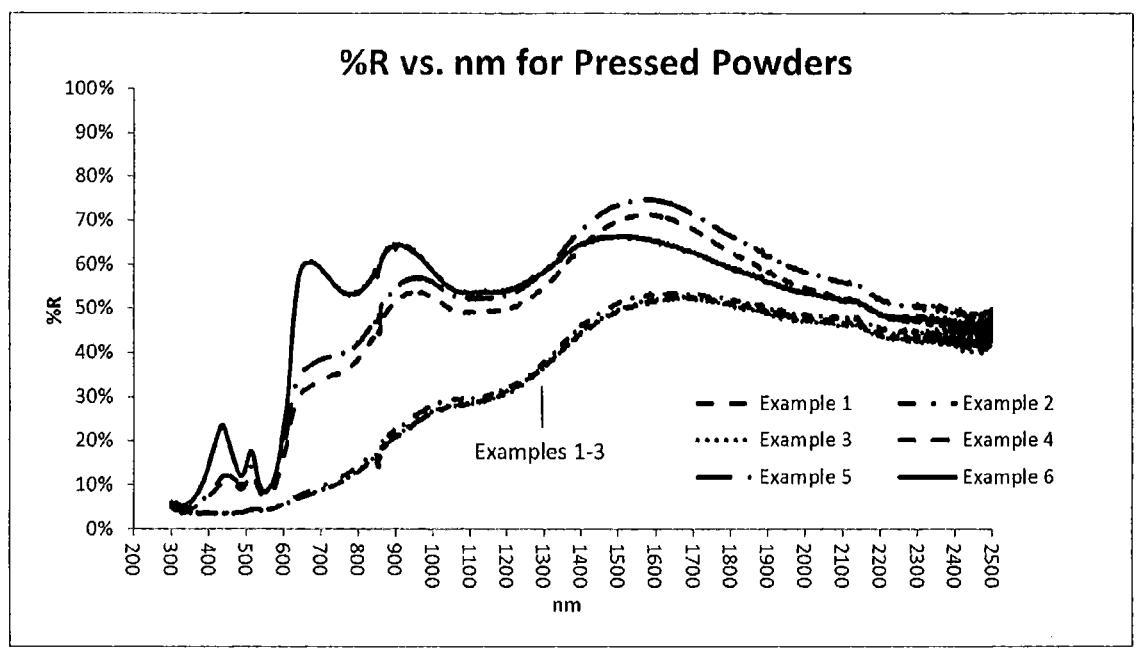
FIG. 1: Overlay of reflectance spectra (% R vs. nm) of pressed powders for Examples 1-6. Examples 1-3 calcined in air are brown. Example 4 calcined in argon without a reducing agent is red brown. Example 5 calcined in argon with silicon as a reducing agent was slightly redder than Example 4. Example 6 calcined in argon with carbon as a reducing agent is magenta red.

The current technology is directed to red and red-shade violet pigments with an hexagonal $ABO_3$ structure of the form Y(In,M)$O_3$ in which M is substituted for In in the trigonal bipyramidal B site of the $ABO_3$ structure, and where M is a mixture containing $Co^{2+}$ and charge compensating ions, or M is a mixture containing $Co^{2+}$ and charge compensating ions, as well as other aliovalent and isovalent ions.

Sample compositions can be prepared by conventional solid state ceramic methods where a stoichiometric precursor mixture of reagents, such as metal oxides, carbonates, sulfates, nitrates, or hydroxides, is intimately mixed and calcined in ceramic crucibles at high temperatures, for example from 800° C. to 1400° C., for a given period of time, for example from 1 to 12 hours, leading to interdiffusion of ions, various reactions, and formation of final products. Intimately mixed sample precursors can also be prepared through other methods, for example, precipitation, hydrothermal, sol-gel, and combustion methods.

In high temperature solid state reactions it is common to use small amounts of additives, known as mineralizers or fluxes, that assist the formation of a desired crystalline phase, and/or aid in diffusion of reactive species, through the formation of melts, eutectics, or reactive vapor phases. The use of mineralizers at an addition rate between 1 and 5% by weight of a precursor composition, often increase the yields of a desired product phase and/or allows reduction of the calcination temperatures required to form the desired product phase. Common mineralizers include, but are not limited to, alkali and alkaline earth metal salts, for example metal hydroxides, halides, carbonates, sulfates, and phosphates, metal oxides such as molybdenum, tungsten, vanadium, and bismuth oxides, and boron oxides such as boric acid, boron oxide, or sodium tetraborate.

A reducing substance, reducing agent, or reductant, for the purposes of this technology, is defined as an element or compound that reduces another chemical species in an oxidation-reduction reaction typically via donation of an electron or electrons. The reducing agent, if it has lost electrons, is said to have been oxidized. In addition, this substance may create an environment in which other substances cannot oxidize.

High temperature solid state reactions often lead to final products with particle sizes larger than desired for pigmentary uses. Comminuting the material, for the purposes of this technology, is defined as reducing the particle size of as-fired synthetic products through mechanical means not limited to media milling, jet milling, or roll milling.

During synthetic processes, materials may require washing or cleaning steps where unwanted and/or side product ions and salts are removed. A variety of acids, bases, and solvents are useful washing agents. Acids, bases and solvents, for the purposes of this technology, include solutions of acids, such as acetic, hydrochloric, and sulfuric acids, along with bases, such as sodium acetate, sodium carbonate, and sodium hydroxide. Solvents may include alcohols such as methanol, ethanol, isopropanol, or other organic liquids such as acetone, methylethylketone, hexane, and toluene.

Substitutional solid solutions of metal oxides form when metal ions of a solute metal oxide are incorporated in the lattice sites of a metal oxide solvent. Formation of a homogeneous solid solution phase relies on the balance of many factors, including oxidation state, ionic radius, and electronegativities of metal ions, and crystal structures of solute and solvent metal oxides. In some cases a solid solution can form across an entire composition range of two end member oxides, such as the solid solution formed from reaction of $Cr_2O_3$ and $Al_2O_3$, $(Cr,Al_{1-x})_2O_3$ where x varies from 0 to 1. In other cases solid solutions will form a homogeneous phase only within a given range of x.

Substitution at sites in the solvent metal oxide with a metal ion of the same oxidation state is isovalent substitution. In solid solutions with aliovalent substitution, ions in the original metal oxide solvent structure are replaced with ions of a different charge. This can lead to cation or anion vacancies, or incorporation of charge balancing, or charge compensating, ions interstitially in normally unpopulated holes in the structure. Alternatively, aliovalent substitution with more than one metal ion can maintain charge balance and overall electroneutrality of the material. For example, two $Al^{3+}$ ions can be replaced with one $Zn^{2+}$ ion and a charge compensating $Ti^{4+}$ ion.

Both isovalent and aliovalent substitution and formation of solid solutions can affect the electronic nature of the solvent metal oxide; the solid solution may exhibit properties different than that of the unsubstituted metal oxide. For example, the band structure and the optical absorption spectra of solid solutions may differ from that of either solute or solvent metal oxide.

Complexes with octahedral coordinated cobalt (II), for example, $[Co(H_2O)]^{2+}$ are often red or pink in color in color. Cobalt containing phosphates show a wide variety of colors resulting from cobalt oxidation state and coordination environment; $Co_3(PO_4)_2$ is vibrant violet and $Co_2P_2O_7$ is a pinkish purple colored material wherein both materials contain divalent cobalt occupying both a 6-fold and 5-fold coordination. A metastable phosphate phase for $NaCoPO_4$, containing cobalt in a five-coordinate trigonal bipyramidal site, was reported to be red. In cobalt violet, $Co_3(PO_4)_2$ (PV14) cobalt is incorporated in both a five-coordinate and a distorted octahedral, six-coordinate site. Similarly, purple-blue products result from Co chromophores in five-coordinate trigonal bipyramidal coordination sites in a $LiMgBO_3$ host. These observations suggest red-shade colors for cobalt in five-coordinate geometries. Co-substituting $YInO_3$ with $Co^{2+}$ and $Ti^{4+}$ to give $Y(Co_xTi_xIn_{1-2x})O_3$, in which cobalt is presumed to be incorporated in a five-coordinate trigonal bipyramidal site, leads to a bright blue-shade red (magenta) product.

Cobalt (II) oxide, CoO, is oxidized to Cobalt (II,III) oxide, $Co_3O_4$ when heated in air between 400 and 900° C. Cobalt (II,III) oxide is converted to cobalt (II) oxide when heated above 900° C. in air or argon; on cooling in air the CoO thus formed reoxidizes to cobalt (II,III) oxide, $Co_3O_4$, below 900° C. Nevertheless, $Co_3O_4$ is a common reagent to deliver Co(II) in high temperature solid state reactions. In some cases Co(II) can be stabilized below 900° C. in air. For example, when Co of various oxidation states undergoes a reaction with $Al_2O_3$, $CoAl_2O_4$ is formed with Co(II) incorporated into the spinel crystalline lattice of the final product.

The thermal stability of Co(II) materials toward oxidation, e.g. when calcined in air, is material dependent and will vary from one chemical to another. The magenta red color of the present technology is observed in argon firings using either $Co_3O_4$ or CoO when a reducing agent such as silicon monoxide, silicon powder, antimony(III) oxide, carbon, or cobalt metal is used alongside the other reagents.

$YInO_3$ adopts a hexagonal $ABO_3$ structure (JCPDS NO: 70-0133; P63 cm space group) with $In^{3+}$ in a five-fold trigonal bipyramidal B site. Under high temperature inert atmosphere calcination of homogenized starting material mixtures of yttrium, indium, cobalt, and titanium reagents, a solid solution is formed where Y is present in the A site and In, Co, and Ti are present in the B site in the hexagonal $ABO_3$ structure, where $In^{3+}$ in the parent $YInO_3$ is substituted with the aliovalent ions, $Co^{2+}$ and $Ti^{4+}$. To our knowledge, divalent cobalt has not been observed in trigonal bipyramidal coordination in the $YInO_3$ and $YMnO_3$ family. Materials with a $YbFe_2O_4$ structure having an AMM'$O_4$ formula also exhibit a five-fold trigonal bipyramidal coordination of the M and M' ions. It is expected that $Co^{2+}$ in materials having the $YbFe_2O_4$ structure would also exhibit a trigonal bipyramidal coordination leading to red and red-shade violet colors.

The hexagonal solid solution $Y(Co,Ti,In)O_3$ where aliovalent ions $Co^{2+}$ and $Ti^{4+}$ are substituted for $In^{3+}$ shows additional absorption features through the visible region compared to the unsubstituted $YInO_3$, thus providing the observed color. Further, additionally substituting $In^{3+}$ in $Y(Co,Ti,In)O_3$ with $Zn^{2+}$, $Mn^{3+}$, or both, in solid solutions $Y(Zn,Co,Ti,In)O_3$, $Y(Co,Ti,In,Mn,)O_3$, and $Y(Zn,Co,Ti,In,Mn)O_3$, leads to other effects on the electronic structure and resulting absorption features of the products compared to the $Co^{2+}/Ti^{4+}$ substituted materials, and provides the ability to further tune the color and reflectance properties of the resulting pigments.

It is not uncommon for metal oxides to deviate from perfect stoichiometry; that is, the ratio of elements in the formula $ABO_3$ may vary (the assumed 1:1:3 ratio for A, B, and O, respectively, may vary), although the material will still exhibit the same structure. These non-stoichiometric defect structures are within the scope of this technology and should be assumed throughout the application and claims.

Substitutions of the following forms are considered within the scope of this technology: Mixed oxides of the form $ABO_3$ with an hexagonal structure, where
1. A=Trivalent $M^{3+}$, and/or and mixtures of trivalent $M^{3+}$ ions
2. A=Mixtures of trivalent $M^{3+}$ and other metals in ratios such that the average oxidation state is $A^{3+}$ and charge neutrality is maintained.
3. B=mixtures of $In^{3+}$ with $Co^{2+}$ and $Ti^{4+}$
4. B=mixtures of $In^{3+}$ with $Co^{2+}$, $Ti^{4+}$, and other divalent $M^{2+}$ ions
5. B=mixtures of $In^{3+}$ with $Co^{2+}$, $Ti^{4+}$, and other trivalent $M^{3+}$
6. B=mixtures of $In^{3+}$ with $Co^{2+}$, $Ti^{4+}$, and other pentavalent $M^{5+}$
7. B=mixtures of $In^{3+}$ with $Co^{2+}$, $Ti^{4+}$, and other hexavalent $M^{6+}$
8. B=mixtures of $In^{3+}$ with $Co^{2+}$ and other metals in ratios such that the average oxidation state is $B^{3+}$ and charge neutrality is maintained.

Below are examples of cobalt and titanium substituted $YInO_3$ pigments. The list below is not comprehensive.
1. $YCo_{0.20}Ti_{0.20}In_{0.60}O_3$
2. $YIn_{1-x}(Co_{0.5}Ti_{0.5})_xO_3$, where $0<x\leq1$
3. $YIn_{1-x}((Co,Zn)_{0.5}Ti_{0.5})_xO_3$, where $0<x\leq1$
4. $Y(In, Mn)_{1-x}(Co_{0.5}Ti_{0.5})_xO_3$, where $0<x\leq1$
5. $Y(In, Mn)_{1-x}((Co,Zn)_{0.5}Ti_{0.5})_xO_3$, where $0<x\leq1$
6. $YCo_xTi_xIn_{1-2x}O_3$
   a. X=0.01-0.50
7. $YCo_xTi_xM_yIn_{1-2x-y}O_3$
   a. X=0.01-0.50
   b. Y=0.00-0.98, where y≤1-2x
   c. M=trivalent $M^{3+}$ ion or a mixture of trivalent ions including Al, Ga, Mn
8. $YCo_xTi_{x-2y}M_yIn_{1-2x+y}O_3$
   a. X=0.01-0.667
   b. Y=0.00-0.333, where y≤x/2
   c. M=pentavalent $M^{5+}$ ion or a mixture of pentavalent ions including Sb, V, Nb, Bi
9. $YCo_xTi_{x-3y}M_yIn_{1-2x+2y}O_3$
   a. X=0.01-0.75
   b. Y=0.00-0.25, where y≤x/3
   M=hexavalent $M^{6+}$ ion or a mixture of hexavalent ions including Mo,
10. $YCo_xTi_{x+y}M_yIn_{1-2x-2y}O_3$
    a. X=0.01-0.50
    b. Y=0.00-0.49, where x+y≤0.5
    c. M=divalent $M^{2+}$ ion or a mixture of divalent ions including Mg, Ca, Sr, Ba, Zn
11. $YCo_xTi_{x+y}M_yN_zIn_{1-2x-2y-z}O_3$
    a. X=0.01-0.50
    b. Y=0.00-0.49, where x+y≤0.5
    c. Z=0.00-0.98, where 0<z≤1-2x-2y
    d. M=divalent $M^{2+}$ ion or a mixture of divalent ions including Mg, Ca, Sr, Ba, Zn
    e. N=trivalent $M^{3+}$ ion or a mixture of trivalent ions including Al, Ga, Mn
12. $ACo_xTi_{x+y}M_yN_zIn_{1-2x-2y-z}O_3$
    a. X=0.01-0.50
    b. Y=0.00-0.49, where x+y≤0.5
    c. Z=0.00-0.98, where 0<z≤1-2x-2y
    d. M=divalent $M^{2+}$ ion or a mixture of divalent ions including Mg, Ca, Sr, Ba, Zn
    e. N=trivalent $M^{3+}$ ion or a mixture of trivalent ions including Al, Ga, Mn
    f. A=trivalent $M^{3+}$ ion or a mixture of trivalent ions including Y, La, Sc, Gd, Tb, Dy, Ho, Er, Tm, Yb, Lu

EXAMPLES

Example 1

$YCo_{0.2}Ti_{0.2}In_{0.6}O_3$, Air-fired, without reducing agent. A mixture of 148.4 grams yttrium oxide ($Y_2O_3$), 109.5 grams indium oxide ($In_2O_3$), 21.0 grams titanium oxide ($TiO_2$), and 21.1 grams cobalt KIM oxide ($Co_3O_4$) with molar ratios of Y:In:Co:Ti=1.00:0.60:0.20:0.20 was homogenized to give a raw material blend that was used for Examples 1 through 6. Ten grams of this raw material blend were calcined in air at 1200° C. for six hours to give a dark brown solid. See Table 1 for reaction conditions and compositional data. See Table 4 for color data. See Table 5 for X-ray Powder Diffraction Data. See FIG. 1 for reflectance spectra.

Example 2

$YCo_{0.2}Ti_{0.2}In_{0.6}O_3$, Air-fired, with reducing agent, Si. A mixture of 24.92 grams of the raw material blend from Example 1 and 0.08 grams silicon powder was homogenized to give a raw material blend that was used for Example 2 and Example 6. Ten grams of this raw material blend were calcined in air at 1200° C. for six hours to give a dark brown solid. See Table 1 for reaction conditions and compositional data. See Table 4 for color data. See Table 5 for X-ray Powder. Diffraction Data. See FIG. 1 for reflectance spectra.

Example 3

$YCo_{0.2}Ti_{0.2}In_{0.6}O_3$, Air-fired, with reducing agent, C. A mixture of 199.16 grams of the raw material blend from Example 1 and 0.84 grams carbon powder was homogenized to give a raw material blend that was used for Examples 3 and Example 7. Ten grams of this raw material blend were calcined in air at 1200° C. for six hours to give a dark brown solid. See Table 1 for reaction conditions and compositional data. See Table 4 for color data. See Table 5 for X-ray Powder Diffraction Data. See FIG. 1 for reflectance spectra.

Example 4

$YCo_{0.2}Ti_{0.2}In_{0.6}O_3$, Argon-fired, without reducing agent. Ten grams of the raw material blend from Example 1 were calcined in flowing argon at 1200° C. for six hours to give a reddish brown solid. See Table 1 for reaction conditions and compositional data. See Table 4 for color data. See Table 5 for X-ray Powder Diffraction Data. See FIG. 1 for reflectance spectra.

Example 5

$YCo_{0.2}Ti_{0.2}In_{0.6}O_3$, Argon-fired, with reducing agent, Si. Ten grams of the raw material blend from Example 2 were calcined in flowing argon at 1200° C. for six hours to give a reddish brown solid. See Table 1 for reaction conditions and compositional data. See Table 4 for color data. See Table 5 for X-ray Powder Diffraction Data. See FIG. 1 for reflectance spectra.

Example 6

$YCo_{0.2}Ti_{0.2}In_{0.6}O_3$, Argon-fired, with reducing agent, C. 70.7 grams of the raw material blend from Example 3 were calcined in flowing argon at 1200° C. for six hours to give a bright, magenta-red solid See Table 1 for reaction conditions and compositional data. See Table 4 for color data. See Table 5 for X-ray Powder Diffraction Data. See FIG. 1 for reflectance spectra.

Example 7

Figure 2:
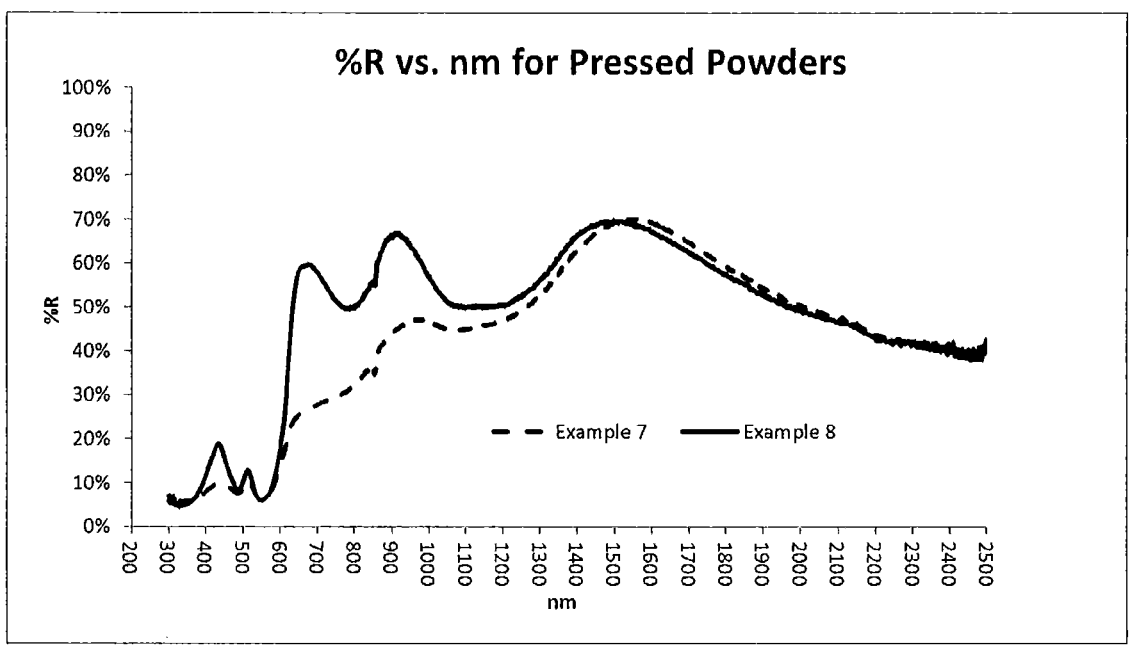
FIG. 2: Overlay of reflectance spectra (% R vs. nm) of pressed powders for Examples 7 and 8. Both Example 7 and Example 8 were calcined in argon and prepared with cobalt (II) oxide, CoO. Example 7, prepared without reducing agent was red-brown. Example 8, prepared with powdered cobalt metal as a cobalt source and as a reducing agent was magenta red.

$YCo_{0.2}Ti_{0.2}In_{0.6}O_3$, Argon-fired, without reducing agent. A mixture of 1.99 grams yttrium oxide ($Y_2O_3$), 1.47 grams indium oxide ($In_2O_3$), 0.28 grams titanium oxide ($TiO_2$), 0.26 grams cobalt (II) oxide (CoO) was homogenized and calcined in flowing argon at 1240° C. to give a reddish brown solid. See Table 1 for reaction conditions and compositional data. See Table 4 for color data. See Table 5 for X-ray Powder Diffraction Data. See FIG. 2 for reflectance spectra.

Example 8

$YCo_{0.2}Ti_{0.2}In_{0.6}O_3$, Argon-fired, with reducing agent, Co. A mixture of 2.00 grams yttrium oxide ($Y_2O_3$), 1.48 grams indium oxide ($In_2O_3$), 0.28 grams titanium oxide ($TiO_2$), 0.13 grams cobalt (II) oxide (CoO), and 0.11 grams powdered cobalt metal was homogenized and calcined in flowing argon at 1240° C. to give a bright, magenta-red solid. See Table 1 for reaction conditions and compositional data. See Table 4 for color data. See Table 5 for X-ray Powder Diffraction Data. See FIG. 2 for reflectance spectra.

Examples 9-18

For Examples 9-18, mixtures of yttrium oxide ($Y_2O_3$), indium oxide ($In_2O_3$), cobalt oxide ($Co_3O_4$), titanium dioxide ($TiO_2$), and manganic oxide ($Mn_3O_4$) in various proportions, close to those for making an electrically neutral hexagonal oxide, were intimately ground in an agate mortar with pestle. The resulting blend was fired under argon or inert atmosphere at temperatures within the range 1150° C. to 1300° C. The resulting products, exhibited a range of colors from red-brown to dark purple. The dominant or sole phase observed in their x-ray powder diffraction patterns was that of hexagonal $YInO_3$. See Table 1 for reaction conditions and compositional data. See Table 4 for color data.

Examples 19-28

For Examples 19-28, mixtures of yttrium oxide ($Y_2O_3$), indium oxide ($In_2O_3$), cobalt oxide ($Co_3O_4$), titanium dioxide ($TiO_2$), and manganic oxide ($Mn_3O_4$) in various proportions, close to those for making an electrically neutral hexagonal oxide, were intimately ground in an agate mortar with pestle. Silicon (m) was added to the resulting blend at 0.3 wt % and ground in an agate mortar with pestle. The resulting blend with silicon was fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal $YInO_3$. See Table 1 for reaction conditions and compositional data. See Table 4 for color data.

Examples 29-33

For Examples 29-33, mixtures of yttrium oxide ($Y_2O_3$), indium oxide ($In_2O_3$), cobalt oxide ($Co_3O_4$), titanium dioxide ($TiO_2$), and aluminum oxide ($Al_2O_3$) in various proportions, close to those for making an electrically neutral hexagonal oxide, were intimately ground in an agate mortar with pestle. The resulting blend with silicon was fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal $YInO_3$. See Table 1 for reaction conditions and compositional data. See Table 4 for color data.

Examples 34-38

For Examples 34-38, mixtures of yttrium oxide ($Y_2O_3$), indium oxide ($In_2O_3$), cobalt oxide ($Co_3O_4$), titanium dioxide ($TiO_2$), and aluminum oxide ($Al_2O_3$) in various proportions, close to those for making an electrically neutral hexagonal oxide, were intimately ground in an agate mortar with pestle. Silicon (m) was added to the resulting blend at 0.3 wt % and ground in an agate mortar with pestle. The resulting blend with silicon was fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal $YInO_3$. See Table 1 for reaction conditions and compositional data. See Table 4 for color data.

Examples 39-48

For Examples 39-48, mixtures of yttrium oxide ($Y_2O_3$), indium oxide ($In_2O_3$), cobalt oxide ($Co_3O_4$), titanium dioxide ($TiO_2$), and zinc oxide (ZnO) in various proportions, close to those for making an electrically neutral hexagonal oxide, were intimately ground in an agate mortar with pestle. Silicon (m) was added to the resulting blend at 0.3 wt % and ground in an agate mortar with pestle. The resulting blend with silicon was fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal $YInO_3$. See Table 1 for reaction conditions and compositional data. See Table 4 for color data.

Examples 49-58

For Examples 39-48, mixtures of yttrium oxide ($Y_2O_3$), indium oxide ($In_2O_3$), cobalt oxide ($Co_3O_4$), titanium dioxide ($TiO_2$), and zinc oxide (ZnO) in various proportions, close to those for making an electrically neutral hexagonal oxide, were intimately ground in an agate mortar with pestle. Silicon (m) was added to the resulting blend at 0.3 wt % and ground in an agate mortar with pestle. The resulting blend with silicon was fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal $YInO_3$. See Table 1 for reaction conditions and compositional data. See Table 4 for color data.

Examples 59-64

For Examples 59-64, mixtures of yttrium oxide ($Y_2O_3$), indium oxide ($In_2O_3$), cobalt oxide ($Co_3O_4$), titanium dioxide ($TiO_2$), and magnesium oxide (MgO), zirconium oxide ($ZrO_2$), and stannic oxide ($SnO_2$) in various proportions, close to those for making an electrically neutral hexagonal oxide, were intimately ground in an agate mortar with pestle. The resulting blend with silicon was fired under argon or inert atmosphere at temperatures within the range 1150° C. to 1300° C. The resulting products, exhibited a range of colors from magenta red to grey-pink. The dominant or sole phase observed in their x-ray powder diffraction patterns was that of hexagonal $YInO_3$. See Table 2 for reaction conditions and compositional data. See Table 4 for color data.

Examples 65-70

For Examples 65-70, Mixtures of yttrium oxide ($Y_2O_3$), indium oxide ($In_2O_3$), cobalt oxide ($Co_3O_4$), titanium dioxide ($TiO_2$), and magnesium oxide (MgO), zirconium oxide ($ZrO_2$), and stannic oxide ($SnO_2$) in various proportions, close to those for making an electrically neutral hexagonal oxide, were intimately ground in an agate mortar with pestle. Silicon (m) was added to the resulting blend at 0.3 wt % and ground in an agate mortar with pestle. The resulting blend with silicon was fired under argon or inert atmosphere at temperatures within the range 1150° C. to 1300° C. The resulting products, exhibited a range of colors from magenta red to tan-grey. The dominant or sole phase observed in their x-ray powder diffraction patterns was that of hexagonal $YInO_3$. See Table 2 for reaction conditions and compositional data. See Table 4 for color data.

Examples 71-76

For Examples 71-76, mixtures of yttrium oxide ($Y_2O_3$), indium oxide ($In_2O_3$), cobalt oxide ($Co_3O_4$), titanium dioxide ($TiO_2$), and zinc oxide (ZnO) in various proportions, close to those for making an electrically neutral hexagonal oxide, were intimately ground in an agate mortar with pestle. Carbon was added to the resulting blend at either a 2:5, 1.5:5, or 1:5 mole ratio of C:Co and ground in an agate mortar with pestle. The resulting blend with Carbon was fired under argon or inert atmosphere at temperatures within the range 1150° C. to 1300° C. The resulting products, exhibited a range of colors from magenta red. The dominant or sole phase observed in their x-ray powder diffraction patterns was that of hexagonal $YInO_3$. See Table 1 for reaction conditions and compositional data. See Table 4 for color data.

Examples 77-80

For Examples 77-80, mixtures of yttrium oxide ($Y_2O_3$), indium oxide ($In_2O_3$), cobalt oxide ($Co_3O_4$), titanium dioxide ($TiO_2$), and zinc oxide (ZnO), and manganic oxide ($Mn_3O_4$), in various proportions, close to those for making an electrically neutral hexagonal oxide, were intimately ground in an agate mortar with pestle. Silicon (m) was added to the resulting blend for Example 77 in a 1:7.5 mole ration Si:Co and ground in an agate mortar with pestle. Carbon was added to the resulting blend of Example 78 in a 1:2.5 mole ratio C:Co and ground in an agate mortar with pestle. All examples were fired under argon or inert atmosphere at temperatures within the range 1150° C. to 1300° C. The resulting products, exhibited a range of colors from magenta red to tan-grey. The dominant or sole phase observed in their x-ray powder diffraction patterns was that of hexagonal $YInO_3$. See Table 1 for reaction conditions and compositional data. See Table 4 for color data. See Table 6 for color values for Examples 79 and 80 in glass enamel.

Examples 81-84

For Examples 81-84, mixtures of yttrium oxide ($Y_2O_3$), indium oxide ($In_2O_3$), cobalt oxide ($Co_3O_4$), titanium dioxide ($TiO_2$), and zinc oxide (ZnO), and manganic oxide ($Mn_3O_4$), in various proportions, close to those for making an electrically neutral hexagonal oxide, were intimately ground in an agate mortar with pestle. Silicon (m) was added to the resulting blend for Examples 77 in a 1:7.5 mole ration Si:Co and ground in an agate mortar with pestle. Carbon was added to the resulting blend of Examples 78 in a 1:2.5 mole ratio C:Co and ground in an agate mortar with pestle. All examples were fired in air at temperatures within the range 1150° C. to 1300° C. The resulting products, exhibited a range of colors from magenta red to tan-grey. The dominant or sole phase observed in their x-ray powder diffraction patterns was that of hexagonal $YInO_3$. See Table 1 for reaction conditions and compositional data. See Table 4 for color data.

Examples 85-89

For Examples 85-89, mixtures of yttrium oxide ($Y_2O_3$), indium oxide ($In_2O_3$), cobalt oxide ($Co_3O_4$), titanium dioxide ($TiO_2$), and zinc oxide (ZnO) in various proportions, close to those for making an electrically neutral hexagonal oxide, were intimately ground in an agate mortar with pestle. Silicon (m) was added to the resulting blend at 0.3 wt % and ground in an agate mortar with pestle. The resulting blend with silicon was fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal $YInO_3$. See Table 1 for reaction conditions and compositional data. See Table 4 for color data.

Examples 90-96

For Examples 90-96, mixtures of yttrium oxide ($Y_2O_3$), indium oxide ($In_2O_3$), cobalt oxide (CoO), cobalt metal (Co), titanium dioxide ($TiO_2$), and zinc oxide (ZnO) in various proportions, close to those for making an electrically neutral hexagonal oxide, were intimately ground in an agate mortar with pestle. The mole ratio of Co(m) to CoO was also held constant at 1:4. The resulting blend was fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal $YInO_3$. See Table 1 for reaction conditions and compositional data. See Table 4 for color data.

Examples 97-105

For Examples 97-105, mixtures of yttrium oxide ($Y_2O_3$), indium oxide ($In_2O_3$), cobalt oxide (CoO), cobalt metal (Co), titanium dioxide ($TiO_2$), and manganic oxide ($Mn_3O_4$) in various proportions, close to those for making an electrically neutral hexagonal oxide, were intimately ground in an agate mortar with pestle. The mole ratio of Co(m) to CoO was also held constant at 1:4. The resulting blends were fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal YInO$_3$. See Table 1 for reaction conditions and compositional data. See Table 4 for color data.

Examples 106-114

Figure 3:
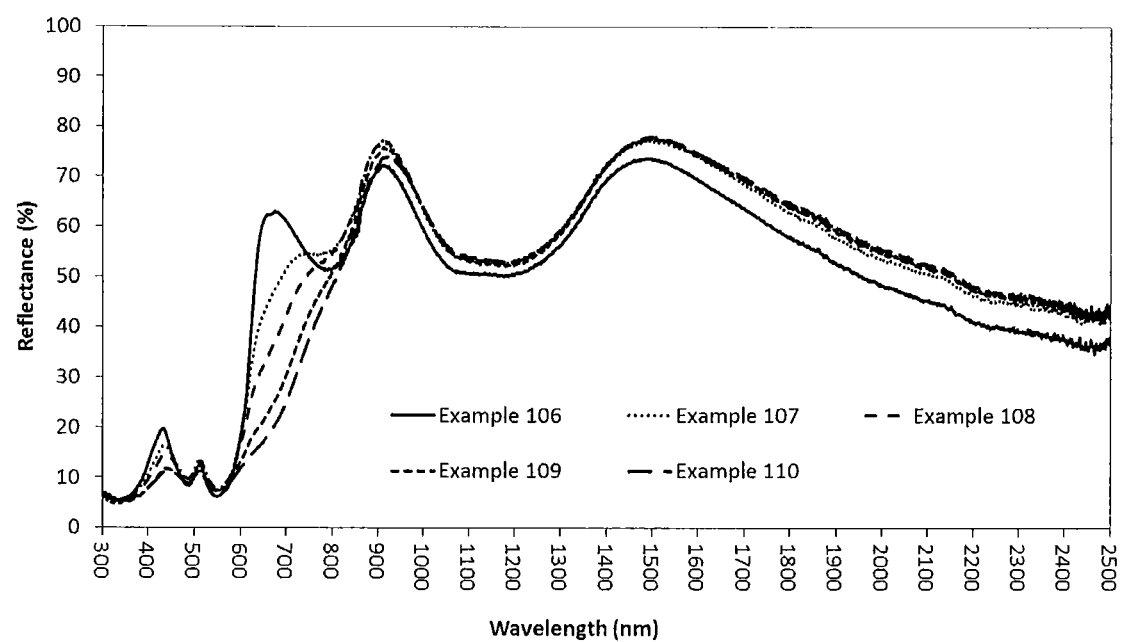
FIG. 3: Overlay of reflectance spectra (% R vs. nm) of pressed powders for Examples 106 through 110.

Mixtures of yttrium oxide (Y$_2$O$_3$), indium oxide (In$_2$O$_3$), cobalt oxide (CoO), cobalt metal (Co), titanium dioxide (TiO$_2$), and manganic oxide (Mn$_3$O$_4$) in various proportions, close to those for making an electrically neutral hexagonal oxide, were intimately ground in an agate mortar with pestle. The mole ratio of Co(m) to CoO was also held constant at 1:1. The resulting blends were fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal YInO$_3$. See Table 1 for reaction conditions and compositional data. See Table 4 for color data. See FIG. 3 for reflectance spectra of Examples 106-110.

Examples 115-123

Mixtures of yttrium oxide (Y$_2$O$_3$), indium oxide (In$_2$O$_3$), cobalt oxide (CoO), cobalt metal (Co), titanium dioxide (TiO$_2$), and manganic oxide (Mn$_3$O$_4$) in various proportions, close to those for making an electrically neutral hexagonal oxide, were intimately ground in an agate mortar with pestle. The mole ratio of Co(m) to CoO was also held constant at 1:1. The resulting blends were fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal YInO$_3$. See Table 1 for reaction conditions and compositional data. See Table 4 for color data.

Examples 124-132

Figure 4:
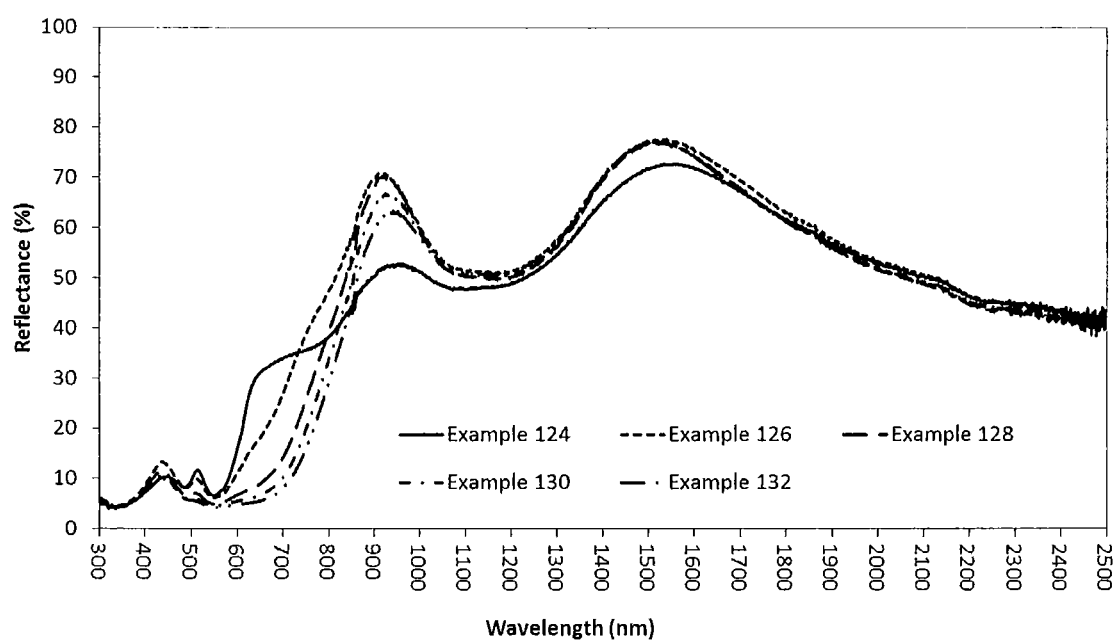
FIG. 4: Overlay of reflectance spectra (% R vs. nm) of pressed powders for Examples 124, 126, 128, 130, 132.

Mixtures of yttrium oxide (Y$_2$O$_3$), indium oxide (In$_2$O$_3$), cobalt oxide (Co$_3$O$_4$), titanium dioxide (TiO$_2$), and manganic oxide (Mn$_3$O$_4$) in various proportions, close to those for making an electrically neutral hexagonal oxide, were intimately ground in an agate mortar with pestle. The resulting blend was fired under argon or inert atmosphere at temperatures within the range 1150° C. to 1300° C. The resulting products, exhibited a range of colors from red-violet to violet. The dominant or sole phase observed in their x-ray powder diffraction patterns was that of hexagonal YInO$_3$. See Table 1 for reaction conditions and compositional data. See Table 4 for color data. See FIG. 4 for reflectance spectra of Examples 124, 126, 128, 130, and 132.

Examples 133-141

Mixtures of yttrium oxide (Y$_2$O$_3$), indium oxide (In$_2$O$_3$), cobalt oxide (Co$_3$O$_4$), titanium dioxide (TiO$_2$), and manganic oxide (Mn$_3$O$_4$) in various proportions, close to those for making an electrically neutral hexagonal oxide, were intimately ground in an agate mortar with pestle. The resulting blend was fired under argon or inert atmosphere at temperatures within the range 1150° C. to 1300° C. The resulting products, exhibited a range of colors from red-violet to violet. The dominant or sole phase observed in their x-ray powder diffraction patterns was that of hexagonal YInO$_3$. See Table 1 for reaction conditions and compositional data. See Table 4 for color data.

Examples 142-159

Mixtures of yttrium oxide (Y$_2$O$_3$), indium oxide (In$_2$O$_3$), cobalt oxide (CoO), cobalt metal (Co), titanium dioxide (TiO$_2$), and aluminum oxide (Al$_2$O$_3$) in various proportions, close to those for making an electrically neutral hexagonal oxide, were intimately ground in an agate mortar with pestle. The mole ratio of Co(m) to CoO was also held constant at 1:1. The resulting blends were fired under argon or inert atmosphere at temperatures within the range 1150° C. to 1300° C. The resulting products, exhibited a range of colors from magenta red to red-violet. The dominant or sole phase observed in their x-ray powder diffraction patterns was that of hexagonal YInO$_3$. See Table 1 for reaction conditions and compositional data. See Table 4 for the color data of Examples 142-150.

Examples 160-168

Figure 5:
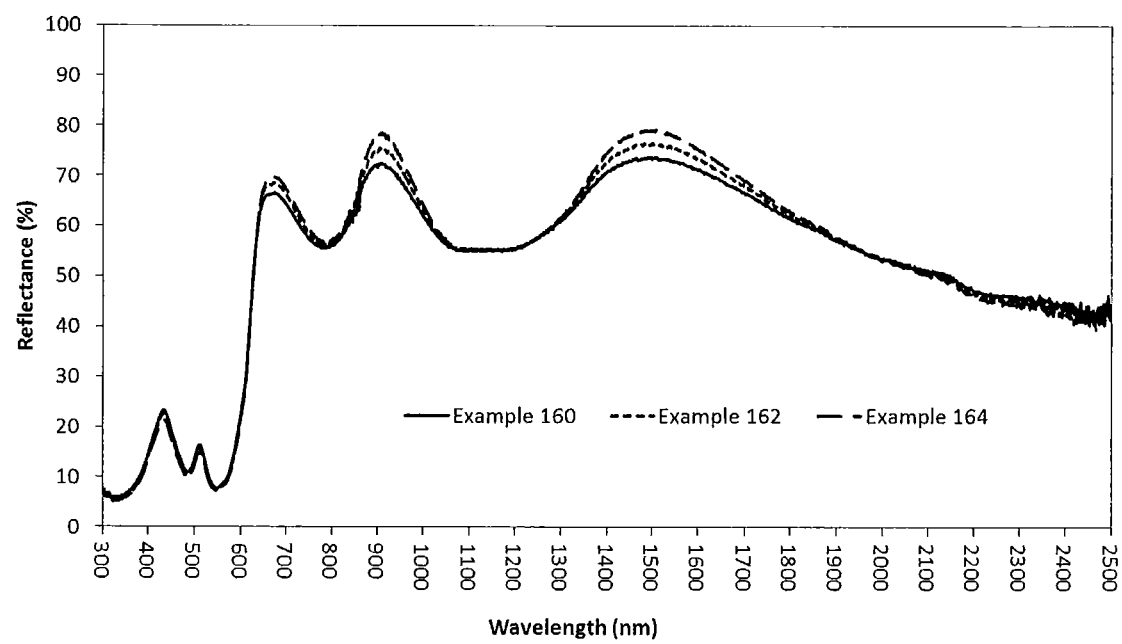
FIG. 5: Overlay of reflectance spectra (% R vs. nm) of pressed powders for Examples 160, 162, and 164.

Mixtures of yttrium oxide (Y$_2$O$_3$), indium oxide (In$_2$O$_3$), cobalt oxide (CoO), cobalt metal (Co), titanium dioxide (TiO$_2$), and zinc oxide (ZnO) in various proportions, close to those for making an electrically neutral hexagonal oxide, were intimately ground in an agate mortar with pestle. The mole ratio of Co(m) to CoO was also held constant at 1:1. The resulting blend was fired under argon or inert atmosphere at temperatures within the range 1150° C. to 1300° C. The resulting products, exhibited a magenta red color. The dominant or sole phase observed in their x-ray powder diffraction patterns was that of hexagonal YInO$_3$. See Table 1 for reaction conditions and compositional data. See Table 4 for color data. See FIG. 5 for reflectance spectra of Examples 160, 162, and 164.

Examples 169-177

Mixtures of yttrium oxide (Y$_2$O$_3$), indium oxide (In$_2$O$_3$), cobalt oxide (CoO), cobalt metal (Co), titanium dioxide (TiO$_2$), and zinc oxide (ZnO) in various proportions, close to those for making an electrically neutral hexagonal oxide, were intimately ground in an agate mortar with pestle. The mole ratio of Co(m) to CoO was also held constant at 1:1. The resulting blends were fired under argon or inert atmosphere at temperatures within the range 1150° C. to 1300° C. The resulting products exhibited a range of colors from magenta red to yellow-red. The dominant or sole phase observed in their x-ray powder diffraction patterns was that of hexagonal YInO$_3$. See Table 1 for reaction conditions and compositional data. See Table 4 for color data.

Examples 178-186

Mixtures of yttrium oxide (Y$_2$O$_3$), indium oxide (In$_2$O$_3$), cobalt oxide (Co$_3$O$_4$), cobalt metal (Co), titanium dioxide (TiO$_2$), calcium carbonate (CaCO$_3$), strontium carbonate (SrCO$_3$), barium carbonate (BaCO$_3$), and lanthanum oxide, (La$_2$O$_3$), in various proportions, close to those for making an electrically neutral hexagonal oxide, were intimately blended. The mole ratio of Co(m) to Co from Co$_3$O$_4$ was held constant at 1:1. The resulting blends were fired under argon at 1300° C. The resulting products exhibited a range of colors from magenta red to yellow-red. See Table 3 for reaction conditions and compositional data. See Table 4 for color data.

Examples 187-189

Mixtures of yttrium oxide ($Y_2O_3$), indium oxide ($In_2O_3$), cobalt oxide (CoO), titanium dioxide ($TiO_2$), and antimony (III) oxide ($Sb_2O_3$) in various proportions, close to those for making an electrically neutral hexagonal oxide, were intimately blended. The resulting blends were fired under argon at 1300° C. The resulting products were magenta red. See Table 3 for reaction conditions and compositional data. See Table 4 for color data.

Example 190

A mixture of yttrium oxide ($Y_2O_3$), indium oxide ($In_2O_3$), titanium oxide ($TiO_2$), cobalt (II,III) oxide ($CO_3O_4$), and carbon (C) with molar ratios of Y:In:Co:Ti=1.00:0.60:0.0.20:0.20:0.08 was homogenized and fired under argon at 1240° C. The magenta red powder had a D50% particle size of 15.4 µm. See Table 1 for reaction conditions and compositional data. See Table 4 for color data. See Table 6 for color values in glass enamel.

Example 191

A portion of Example 190 was jetmilled to reduce the particle size leading to Example 191 with a D50% particle size of 3.91 µm. See Table 1 for reaction conditions and compositional data. See Table 4 for color data. See Table 6 for color values in glass enamel.

Example 192

A mixture of yttrium oxide ($Y_2O_3$), indium oxide ($In_2O_3$), titanium oxide ($TiO_2$), cobalt (II,III) oxide ($Co_3O_4$), and carbon (C) with molar ratios of Y:In:Co:Ti=1.00:0.60:0.0.15:0.20:0.06 was homogenized and fired under argon at 1240° C. The magenta red powder had a D50% particle size of 14.35 µm. See Table 1 for reaction conditions and compositional data. See Table 4 for color data. See Table 6 for color values in glass enamel.

Example 193

A portion of Example 192 was jetmilled to reduce the particle size leading to Example 193 with a D50% particle size of 3.90 µM. See Table 1 for reaction conditions and compositional data. See Table 4 for color data. See Table 6 for color values in glass enamel.

Example 194

A mixture of Yttrium oxide ($Y_2O_3$), Indium oxide ($In_2O_3$), Cobalt oxide (CoO), Cobalt metal (Co), Titanium dioxide ($TiO_2$), and Zinc oxide (ZnO) with molar ratios of Y:In:Co:Zn:Ti=1:0.50:0.125:0.125:0.25, close to those for making an electrically neutral hexagonal oxide, was intimately ground in an agate mortar with pestle. The mole ratio of Co(m) to CoO was also held constant at 1:1. The resulting blend with was fired under argon or inert atmosphere at a temperature of 1250° C. The resulting product, exhibited a magenta red color. The dominant or sole phase observed in the x-ray powder diffraction pattern was that of hexagonal $YInO_3$. See Table 1 for reaction conditions and compositional data. See Table 4 for color data. See Table 6 for color values in glass enamel.

TABLE 1

Reaction Conditions and Compositional data for Examples 1-58, 71-177, 190-194

| Example | Cobalt Source | Reducing Agent | Atmosphere | Mole Y | Mole In | Mole Co | Mole Zn | Mole Ti | Mole Al | Mole Mn |
|---|---|---|---|---|---|---|---|---|---|---|
| 1 | Co3O4 | None | Air | 1.000 | 0.600 | 0.200 | | 0.200 | | |
| 2 | Co3O4 | Si | Air | 1.000 | 0.600 | 0.200 | | 0.200 | | |
| 3 | Co3O4 | C | Air | 1.000 | 0.600 | 0.200 | | 0.200 | | |
| 4 | Co3O4 | None | Argon | 1.000 | 0.600 | 0.200 | | 0.200 | | |
| 5 | Co3O4 | Si | Argon | 1.000 | 0.600 | 0.200 | | 0.200 | | |
| 6 | Co3O4 | C | Argon | 1.000 | 0.600 | 0.200 | | 0.200 | | |
| 7 | CoO | None | Argon | 1.000 | 0.600 | 0.200 | | 0.200 | | |
| 8 | CoO/Co(m) | Co(m) | Argon | 1.000 | 0.600 | 0.200 | | 0.200 | | |
| 9 | Co3O4 | None | Argon | 1.000 | 0.700 | 0.150 | | 0.150 | | |
| 10 | Co3O4 | None | Argon | 1.000 | 0.695 | 0.150 | | 0.150 | | 0.005 |
| 11 | Co3O4 | None | Argon | 1.000 | 0.690 | 0.150 | | 0.150 | | 0.010 |
| 12 | Co3O4 | None | Argon | 1.000 | 0.680 | 0.150 | | 0.150 | | 0.020 |
| 13 | Co3O4 | None | Argon | 1.000 | 0.670 | 0.150 | | 0.150 | | 0.030 |
| 14 | Co3O4 | None | Argon | 1.000 | 0.660 | 0.150 | | 0.150 | | 0.040 |
| 15 | Co3O4 | None | Argon | 1.000 | 0.650 | 0.150 | | 0.150 | | 0.050 |
| 16 | Co3O4 | None | Argon | 1.000 | 0.640 | 0.150 | | 0.150 | | 0.060 |
| 17 | Co3O4 | None | Argon | 1.000 | 0.630 | 0.150 | | 0.150 | | 0.070 |
| 18 | Co3O4 | None | Argon | 1.000 | 0.620 | 0.150 | | 0.150 | | 0.080 |
| 19 | Co3O4 | Si | Argon | 1.000 | 0.700 | 0.150 | | 0.150 | | |
| 20 | Co3O4 | Si | Argon | 1.000 | 0.695 | 0.150 | | 0.150 | | 0.005 |
| 21 | Co3O4 | Si | Argon | 1.000 | 0.690 | 0.150 | | 0.150 | | 0.010 |
| 22 | Co3O4 | Si | Argon | 1.000 | 0.680 | 0.150 | | 0.150 | | 0.020 |
| 23 | Co3O4 | Si | Argon | 1.000 | 0.670 | 0.150 | | 0.150 | | 0.030 |
| 24 | Co3O4 | Si | Argon | 1.000 | 0.660 | 0.150 | | 0.150 | | 0.040 |
| 25 | Co3O4 | Si | Argon | 1.000 | 0.650 | 0.150 | | 0.150 | | 0.050 |
| 26 | Co3O4 | Si | Argon | 1.000 | 0.640 | 0.150 | | 0.150 | | 0.060 |
| 27 | Co3O4 | Si | Argon | 1.000 | 0.630 | 0.150 | | 0.150 | | 0.070 |
| 28 | Co3O4 | Si | Argon | 1.000 | 0.620 | 0.150 | | 0.150 | | 0.080 |
| 29 | Co3O4 | None | Argon | 1.000 | 0.875 | 0.050 | | 0.050 | 0.025 | |
| 30 | Co3O4 | None | Argon | 1.000 | 0.775 | 0.100 | | 0.100 | 0.025 | |

TABLE 1-continued

Reaction Conditions and Compositional data for Examples 1-58, 71-177, 190-194

| Example | Cobalt Source | Reducing Agent | Atmosphere | Mole Y | Mole In | Mole Co | Mole Zn | Mole Ti | Mole Al | Mole Mn |
|---|---|---|---|---|---|---|---|---|---|---|
| 31 | Co3O4 | None | Argon | 1.000 | 0.675 | 0.150 | | 0.150 | 0.025 | |
| 32 | Co3O4 | None | Argon | 1.000 | 0.625 | 0.175 | | 0.175 | 0.025 | |
| 33 | Co3O4 | None | Argon | 1.000 | 0.575 | 0.200 | | 0.200 | 0.025 | |
| 34 | Co3O4 | Si | Argon | 1.000 | 0.875 | 0.050 | | 0.050 | 0.025 | |
| 35 | Co3O4 | Si | Argon | 1.000 | 0.775 | 0.100 | | 0.100 | 0.025 | |
| 36 | Co3O4 | Si | Argon | 1.000 | 0.675 | 0.150 | | 0.150 | 0.025 | |
| 37 | Co3O4 | Si | Argon | 1.000 | 0.625 | 0.175 | | 0.175 | 0.025 | |
| 38 | Co3O4 | Si | Argon | 1.000 | 0.575 | 0.200 | | 0.200 | 0.025 | |
| 39 | Co3O4 | Si | Argon | 1.000 | 0.950 | 0.019 | 0.006 | 0.025 | | |
| 40 | Co3O4 | Si | Argon | 1.000 | 0.900 | 0.038 | 0.013 | 0.050 | | |
| 41 | Co3O4 | Si | Argon | 1.000 | 0.850 | 0.056 | 0.019 | 0.075 | | |
| 42 | Co3O4 | Si | Argon | 1.000 | 0.800 | 0.075 | 0.025 | 0.100 | | |
| 43 | Co3O4 | Si | Argon | 1.000 | 0.750 | 0.094 | 0.031 | 0.125 | | |
| 44 | Co3O4 | Si | Argon | 1.000 | 0.700 | 0.113 | 0.038 | 0.150 | | |
| 45 | Co3O4 | Si | Argon | 1.000 | 0.650 | 0.131 | 0.044 | 0.175 | | |
| 46 | Co3O4 | Si | Argon | 1.000 | 0.600 | 0.150 | 0.050 | 0.200 | | |
| 47 | Co3O4 | Si | Argon | 1.000 | 0.550 | 0.169 | 0.056 | 0.225 | | |
| 48 | Co3O4 | Si | Argon | 1.000 | 0.500 | 0.188 | 0.063 | 0.250 | | |
| 49 | Co3O4 | Si | Argon | 1.000 | 0.950 | 0.019 | 0.006 | 0.025 | | |
| 50 | Co3O4 | Si | Argon | 1.000 | 0.900 | 0.038 | 0.013 | 0.050 | | |
| 51 | Co3O4 | Si | Argon | 1.000 | 0.850 | 0.056 | 0.019 | 0.075 | | |
| 52 | Co3O4 | Si | Argon | 1.000 | 0.800 | 0.075 | 0.025 | 0.100 | | |
| 53 | Co3O4 | Si | Argon | 1.000 | 0.750 | 0.094 | 0.031 | 0.125 | | |
| 54 | Co3O4 | Si | Argon | 1.000 | 0.700 | 0.113 | 0.038 | 0.150 | | |
| 55 | Co3O4 | Si | Argon | 1.000 | 0.650 | 0.131 | 0.044 | 0.175 | | |
| 56 | Co3O4 | Si | Argon | 1.000 | 0.600 | 0.150 | 0.050 | 0.200 | | |
| 57 | Co3O4 | Si | Argon | 1.000 | 0.550 | 0.169 | 0.056 | 0.225 | | |
| 58 | Co3O4 | Si | Argon | 1.000 | 0.500 | 0.188 | 0.063 | 0.250 | | |
| 71 | Co3O4 | C | Argon | 1.000 | 0.600 | 0.150 | 0.050 | 0.200 | | |
| 72 | Co3O4 | C | Argon | 1.000 | 0.600 | 0.150 | 0.050 | 0.200 | | |
| 73 | Co3O4 | C | Argon | 1.000 | 0.600 | 0.150 | 0.050 | 0.200 | | |
| 74 | Co3O4 | C | Argon | 1.000 | 0.600 | 0.175 | 0.025 | 0.200 | | |
| 75 | Co3O4 | C | Argon | 1.000 | 0.600 | 0.175 | 0.025 | 0.200 | | |
| 76 | Co3O4 | C | Argon | 1.000 | 0.600 | 0.175 | 0.025 | 0.200 | | |
| 77 | Co3O4 | Si | Argon | 1.000 | 0.600 | 0.150 | 0.050 | 0.200 | | |
| 78 | Co3O4 | C | Argon | 1.000 | 0.600 | 0.150 | 0.050 | 0.200 | | |
| 79 | Co3O4 | None | Argon | 1.000 | 0.670 | 0.150 | | 0.150 | | 0.030 |
| 80 | Co3O4 | None | Argon | 1.000 | 0.640 | 0.150 | | 0.150 | | 0.060 |
| 81 | Co3O4 | Si | AIR | 1.000 | 0.600 | 0.150 | 0.050 | 0.200 | | |
| 82 | Co3O4 | C | AIR | 1.000 | 0.600 | 0.150 | 0.050 | 0.200 | | |
| 83 | Co3O4 | None | AIR | 1.000 | 0.670 | 0.150 | | 0.150 | | 0.030 |
| 84 | Co3O4 | None | AIR | 1.000 | 0.640 | 0.150 | | 0.150 | | 0.060 |
| 85 | Co3O4 | Si | Argon | 1.000 | 0.750 | 0.094 | 0.031 | 0.125 | | |
| 86 | Co3O4 | Si | Argon | 1.000 | 0.700 | 0.113 | 0.038 | 0.150 | | |
| 87 | Co3O4 | Si | Argon | 1.000 | 0.650 | 0.131 | 0.044 | 0.175 | | |
| 88 | Co3O4 | Si | Argon | 1.000 | 0.600 | 0.150 | 0.050 | 0.200 | | |
| 89 | Co3O4 | Si | Argon | 1.000 | 0.550 | 0.169 | 0.056 | 0.225 | | |
| 90 | CoO/Co(m) | Co(m) | Argon | 1.000 | 0.600 | 0.200 | | 0.200 | | |
| 91 | CoO/Co(m) | Co(m) | Argon | 1.000 | 0.700 | 0.150 | | 0.150 | | |
| 92 | CoO/Co(m) | Co(m) | Argon | 1.000 | 0.750 | 0.094 | 0.031 | 0.125 | | |
| 93 | CoO/Co(m) | Co(m) | Argon | 1.000 | 0.700 | 0.113 | 0.038 | 0.150 | | |
| 94 | CoO/Co(m) | Co(m) | Argon | 1.000 | 0.650 | 0.131 | 0.044 | 0.175 | | |
| 95 | CoO/Co(m) | Co(m) | Argon | 1.000 | 0.600 | 0.150 | 0.050 | 0.200 | | |
| 96 | CoO/Co(m) | Co(m) | Argon | 1.000 | 0.550 | 0.169 | 0.056 | 0.225 | | |
| 97 | CoO/Co(m) | Co(m) | Argon | 1.000 | 0.695 | 0.150 | | 0.150 | | |
| 98 | CoO/Co(m) | Co(m) | Argon | 1.000 | 0.695 | 0.150 | | 0.150 | | 0.005 |
| 99 | CoO/Co(m) | Co(m) | Argon | 1.000 | 0.690 | 0.150 | | 0.150 | | 0.010 |
| 100 | CoO/Co(m) | Co(m) | Argon | 1.000 | 0.680 | 0.150 | | 0.150 | | 0.020 |
| 101 | CoO/Co(m) | Co(m) | Argon | 1.000 | 0.670 | 0.150 | | 0.150 | | 0.030 |
| 102 | CoO/Co(m) | Co(m) | Argon | 1.000 | 0.660 | 0.150 | | 0.150 | | 0.040 |
| 103 | CoO/Co(m) | Co(m) | Argon | 1.000 | 0.650 | 0.150 | | 0.150 | | 0.050 |
| 104 | CoO/Co(m) | Co(m) | Argon | 1.000 | 0.640 | 0.150 | | 0.150 | | 0.060 |
| 105 | CoO/Co(m) | Co(m) | Argon | 1.000 | 0.630 | 0.150 | | 0.150 | | 0.070 |
| 106 | CoO/Co(m) | Co(m) | Argon | 1.000 | 0.600 | 0.200 | | 0.200 | | |
| 107 | CoO/Co(m) | Co(m) | Argon | 1.000 | 0.600 | 0.198 | | 0.198 | | 0.005 |
| 108 | CoO/Co(m) | Co(m) | Argon | 1.000 | 0.600 | 0.195 | | 0.195 | | 0.010 |
| 109 | CoO/Co(m) | Co(m) | Argon | 1.000 | 0.600 | 0.190 | | 0.190 | | 0.020 |
| 110 | CoO/Co(m) | Co(m) | Argon | 1.000 | 0.600 | 0.185 | | 0.185 | | 0.030 |
| 111 | CoO/Co(m) | Co(m) | Argon | 1.000 | 0.600 | 0.180 | | 0.180 | | 0.040 |
| 112 | CoO/Co(m) | Co(m) | Argon | 1.000 | 0.600 | 0.175 | | 0.175 | | 0.050 |
| 113 | CoO/Co(m) | Co(m) | Argon | 1.000 | 0.600 | 0.170 | | 0.170 | | 0.060 |
| 114 | CoO/Co(m) | Co(m) | Argon | 1.000 | 0.600 | 0.165 | | 0.165 | | 0.070 |
| 115 | CoO/Co(m) | Co(m) | Argon | 1.000 | 0.600 | 0.200 | | 0.200 | | |
| 116 | CoO/Co(m) | Co(m) | Argon | 1.000 | 0.600 | 0.198 | | 0.198 | | 0.005 |

TABLE 1-continued

Reaction Conditions and Compositional data for Examples 1-58, 71-177, 190-194

| Example | Cobalt Source | Reducing Agent | Atmosphere | Mole Y | Mole In | Mole Co | Mole Zn | Mole Ti | Mole Al | Mole Mn |
|---|---|---|---|---|---|---|---|---|---|---|
| 117 | CoO/Co(m) | Co(m) | Argon | 1.000 | 0.600 | 0.195 | | 0.195 | | 0.010 |
| 118 | CoO/Co(m) | Co(m) | Argon | 1.000 | 0.600 | 0.190 | | 0.190 | | 0.020 |
| 119 | CoO/Co(m) | Co(m) | Argon | 1.000 | 0.600 | 0.185 | | 0.185 | | 0.030 |
| 120 | CoO/Co(m) | Co(m) | Argon | 1.000 | 0.600 | 0.180 | | 0.180 | | 0.040 |
| 121 | CoO/Co(m) | Co(m) | Argon | 1.000 | 0.600 | 0.175 | | 0.175 | | 0.050 |
| 122 | CoO/Co(m) | Co(m) | Argon | 1.000 | 0.600 | 0.170 | | 0.170 | | 0.060 |
| 123 | CoO/Co(m) | Co(m) | Argon | 1.000 | 0.600 | 0.165 | | 0.165 | | 0.070 |
| 124 | Co3O4 | none | Argon | 1.000 | 0.600 | 0.200 | | 0.200 | | |
| 125 | Co3O4 | none | Argon | 1.000 | 0.600 | 0.198 | | 0.198 | | 0.005 |
| 126 | Co3O4 | none | Argon | 1.000 | 0.600 | 0.195 | | 0.195 | | 0.010 |
| 127 | Co3O4 | none | Argon | 1.000 | 0.600 | 0.190 | | 0.190 | | 0.020 |
| 128 | Co3O4 | none | Argon | 1.000 | 0.600 | 0.185 | | 0.185 | | 0.030 |
| 129 | Co3O4 | none | Argon | 1.000 | 0.600 | 0.180 | | 0.180 | | 0.040 |
| 130 | Co3O4 | none | Argon | 1.000 | 0.600 | 0.175 | | 0.175 | | 0.050 |
| 131 | Co3O4 | none | Argon | 1.000 | 0.600 | 0.170 | | 0.170 | | 0.060 |
| 132 | Co3O4 | none | Argon | 1.000 | 0.600 | 0.165 | | 0.165 | | 0.070 |
| 133 | Co3O4 | none | Argon | 1.000 | 0.600 | 0.200 | | 0.200 | | |
| 134 | Co3O4 | none | Argon | 1.000 | 0.600 | 0.198 | | 0.198 | | 0.005 |
| 135 | Co3O4 | none | Argon | 1.000 | 0.600 | 0.195 | | 0.195 | | 0.010 |
| 136 | Co3O4 | none | Argon | 1.000 | 0.600 | 0.190 | | 0.190 | | 0.020 |
| 137 | Co3O4 | none | Argon | 1.000 | 0.600 | 0.185 | | 0.185 | | 0.030 |
| 138 | Co3O4 | none | Argon | 1.000 | 0.600 | 0.180 | | 0.180 | | 0.040 |
| 139 | Co3O4 | none | Argon | 1.000 | 0.600 | 0.175 | | 0.175 | | 0.050 |
| 140 | Co3O4 | none | Argon | 1.000 | 0.600 | 0.170 | | 0.170 | | 0.060 |
| 141 | Co3O4 | none | Argon | 1.000 | 0.600 | 0.165 | | 0.165 | | 0.070 |
| 142 | CoO/Co(m) | Co(m) | Argon | 1.000 | 0.600 | 0.200 | | 0.200 | | |
| 143 | CoO/Co(m) | Co(m) | Argon | 1.000 | 0.600 | 0.198 | | 0.198 | 0.005 | |
| 144 | CoO/Co(m) | Co(m) | Argon | 1.000 | 0.600 | 0.195 | | 0.195 | 0.010 | |
| 145 | CoO/Co(m) | Co(m) | Argon | 1.000 | 0.600 | 0.190 | | 0.190 | 0.020 | |
| 146 | CoO/Co(m) | Co(m) | Argon | 1.000 | 0.600 | 0.185 | | 0.185 | 0.030 | |
| 147 | CoO/Co(m) | Co(m) | Argon | 1.000 | 0.600 | 0.180 | | 0.180 | 0.040 | |
| 148 | CoO/Co(m) | Co(m) | Argon | 1.000 | 0.600 | 0.175 | | 0.175 | 0.050 | |
| 149 | CoO/Co(m) | Co(m) | Argon | 1.000 | 0.600 | 0.163 | | 0.163 | 0.075 | |
| 150 | CoO/Co(m) | Co(m) | Argon | 1.000 | 0.600 | 0.100 | | 0.150 | 0.100 | |
| 151 | CoO/Co(m) | Co(m) | Argon | 1.000 | 0.600 | 0.200 | | 0.200 | | |
| 152 | CoO/Co(m) | Co(m) | Argon | 1.000 | 0.600 | 0.198 | | 0.198 | 0.005 | |
| 153 | CoO/Co(m) | Co(m) | Argon | 1.000 | 0.600 | 0.195 | | 0.195 | 0.010 | |
| 154 | CoO/Co(m) | Co(m) | Argon | 1.000 | 0.600 | 0.190 | | 0.190 | 0.020 | |
| 155 | CoO/Co(m) | Co(m) | Argon | 1.000 | 0.600 | 0.185 | | 0.185 | 0.030 | |
| 156 | CoO/Co(m) | Co(m) | Argon | 1.000 | 0.600 | 0.180 | | 0.180 | 0.040 | |
| 157 | CoO/Co(m) | Co(m) | Argon | 1.000 | 0.600 | 0.175 | | 0.175 | 0.050 | |
| 158 | CoO/Co(m) | Co(m) | Argon | 1.000 | 0.600 | 0.163 | | 0.163 | 0.075 | |
| 159 | CoO/Co(m) | Co(m) | Argon | 1.000 | 0.600 | 0.100 | | 0.150 | 0.100 | |
| 160 | CoO/Co(m) | Co(m) | Argon | 1.000 | 0.600 | 0.200 | | 0.200 | | |
| 161 | CoO/Co(m) | Co(m) | Argon | 1.000 | 0.600 | 0.195 | 0.005 | 0.200 | | |
| 162 | CoO/Co(m) | Co(m) | Argon | 1.000 | 0.600 | 0.190 | 0.010 | 0.200 | | |
| 163 | CoO/Co(m) | Co(m) | Argon | 1.000 | 0.600 | 0.180 | 0.020 | 0.200 | | |
| 164 | CoO/Co(m) | Co(m) | Argon | 1.000 | 0.600 | 0.170 | 0.030 | 0.200 | | |
| 165 | CoO/Co(m) | Co(m) | Argon | 1.000 | 0.600 | 0.160 | 0.040 | 0.200 | | |
| 166 | CoO/Co(m) | Co(m) | Argon | 1.000 | 0.600 | 0.150 | 0.050 | 0.200 | | |
| 167 | CoO/Co(m) | Co(m) | Argon | 1.000 | 0.600 | 0.125 | 0.075 | 0.200 | | |
| 168 | CoO/Co(m) | Co(m) | Argon | 1.000 | 0.600 | 0.100 | 0.100 | 0.200 | | |
| 169 | CoO/Co(m) | Co(m) | Argon | 1.000 | 0.600 | 0.200 | | 0.200 | | |
| 170 | CoO/Co(m) | Co(m) | Argon | 1.000 | 0.590 | 0.200 | 0.005 | 0.205 | | |
| 171 | CoO/Co(m) | Co(m) | Argon | 1.000 | 0.580 | 0.200 | 0.010 | 0.210 | | |
| 172 | CoO/Co(m) | Co(m) | Argon | 1.000 | 0.560 | 0.200 | 0.020 | 0.220 | | |
| 173 | CoO/Co(m) | Co(m) | Argon | 1.000 | 0.540 | 0.200 | 0.030 | 0.230 | | |
| 174 | CoO/Co(m) | Co(m) | Argon | 1.000 | 0.520 | 0.200 | 0.040 | 0.240 | | |
| 175 | CoO/Co(m) | Co(m) | Argon | 1.000 | 0.500 | 0.200 | 0.050 | 0.250 | | |
| 176 | CoO/Co(m) | Co(m) | Argon | 1.000 | 0.450 | 0.200 | 0.075 | 0.275 | | |
| 177 | CoO/Co(m) | Co(m) | Argon | 1.000 | 0.400 | 0.200 | 0.100 | 0.300 | | |
| 190 | Co3O4 | C | Argon | 1.000 | 0.600 | 0.200 | | 0.200 | | |
| 191 | Co3O4 | C | Argon | 1.000 | 0.600 | 0.200 | | 0.200 | | |
| 192 | Co3O4 | C | Argon | 1.000 | 0.600 | 0.150 | | 0.200 | | |
| 193 | Co3O4 | C | Argon | 1.000 | 0.600 | 0.150 | | 0.200 | | |
| 194 | CoO/Co(m) | Co(m) | Argon | 1.000 | 0.500 | 0.125 | 0.125 | 0.250 | | |

TABLE 2

Reaction Conditions and Compositional data for Examples 59-70.

| Example | Cobalt Source | Reducing Agent | Atmosphere | Mole Y | Mole In | Mole Co | Mole Ti | Mole Mg | Mole Zr | Mole Sn |
|---|---|---|---|---|---|---|---|---|---|---|
| 59 | Co3O4 | None | Argon | 1.000 | 0.700 | 0.150 | 0.150 | | | |
| 60 | Co3O4 | None | Argon | 1.000 | 0.700 | 0.100 | 0.150 | 0.050 | | |
| 61 | Co3O4 | None | Argon | 1.000 | 0.700 | 0.150 | 0.100 | | 0.050 | |
| 62 | Co3O4 | None | Argon | 1.000 | 0.700 | 0.150 | | | 0.150 | |
| 63 | Co3O4 | None | Argon | 1.000 | 0.700 | 0.150 | 0.100 | | | 0.050 |
| 64 | Co3O4 | None | Argon | 1.000 | 0.700 | 0.150 | | | | 0.150 |
| 65 | Co3O4 | Si | Argon | 1.000 | 0.700 | 0.150 | 0.150 | | | |
| 66 | Co3O4 | Si | Argon | 1.000 | 0.700 | 0.100 | 0.150 | 0.050 | | |
| 67 | Co3O4 | Si | Argon | 1.000 | 0.700 | 0.150 | 0.100 | | 0.050 | |
| 68 | Co3O4 | Si | Argon | 1.000 | 0.700 | 0.150 | | | 0.150 | |
| 69 | Co3O4 | Si | Argon | 1.000 | 0.700 | 0.150 | 0.100 | | | 0.050 |
| 70 | Co3O4 | Si | Argon | 1.000 | 0.700 | 0.150 | | | | 0.150 |

TABLE 3

Reaction Conditions and Compositional data for Examples 178-189.

| Example | Cobalt Source | Reducing Agent | Atmosphere | Mole Y | Mole In | Mole Co | Mole Ti | Mole Sb | Mole Sr | Mole Ba | Mole La | Mole Ca |
|---|---|---|---|---|---|---|---|---|---|---|---|---|
| 178 | Co3O4/Co(m) | Co(m) | Argon | 1.000 | 0.600 | 0.200 | 0.200 | | | | | |
| 179 | Co3O4/Co(m) | Co(m) | Argon | 0.950 | 0.550 | 0.200 | 0.250 | | 0.050 | | | |
| 180 | Co3O4/Co(m) | Co(m) | Argon | 0.900 | 0.500 | 0.200 | 0.300 | | 0.100 | | | |
| 181 | Co3O4/Co(m) | Co(m) | Argon | 0.950 | 0.550 | 0.200 | 0.250 | | | 0.050 | | |
| 182 | Co3O4/Co(m) | Co(m) | Argon | 0.900 | 0.500 | 0.200 | 0.300 | | | 0.100 | | |
| 183 | Co3O4/Co(m) | Co(m) | Argon | 0.950 | 0.600 | 0.200 | 0.200 | | | | 0.050 | |
| 184 | Co3O4/Co(m) | Co(m) | Argon | 0.900 | 0.600 | 0.200 | 0.200 | | | | 0.100 | |
| 185 | Co3O4/Co(m) | Co(m) | Argon | 0.950 | 0.550 | 0.200 | 0.250 | | | | | 0.050 |
| 186 | Co3O4/Co(m) | Co(m) | Argon | 0.900 | 0.500 | 0.200 | 0.300 | | | | | 0.100 |
| 187 | CoO | none | Argon | 1.000 | 0.600 | 0.200 | 0.200 | | | | | |
| 188 | CoO | Sb3+ | Argon | 1.000 | 0.600 | 0.200 | 0.150 | 0.050 | | | | |
| 189 | CoO | Sb3+ | Argon | 1.000 | 0.600 | 0.200 | 0.100 | 0.100 | | | | |

TABLE 4

CIE color values for Examples 1-194 measured as calcined powders in a cuvette with spectral reflectance excluded on a PerkinElmer Lambda 900 UV/Vis/NIR with D65 illuminant and a 10° Standard Observer.

| Example | L* | a* | b* | C* | h | Color Description |
|---|---|---|---|---|---|---|
| 1 | 25.9 | 4.8 | 5.3 | 7.2 | 47.8 | Dark Brown |
| 2 | 26.6 | 5.5 | 6.7 | 8.7 | 50.6 | Dark Brown |
| 3 | 25.7 | 5.1 | 5.8 | 7.7 | 48.7 | Dark Brown |
| 4 | 41.0 | 18.9 | 5.0 | 19.6 | 14.8 | Red Brown |
| 5 | 43.7 | 20.0 | 5.7 | 20.8 | 15.9 | Red Brown |
| 6 | 48.1 | 32.2 | −4.2 | 32.5 | 352.6 | Magenta Red |
| 7 | 37.8 | 18.6 | 2.3 | 18.7 | 7.0 | Red Brown |
| 8 | 43.0 | 35.9 | −3.1 | 36.0 | 355.1 | Magenta Red |
| 9 | 41.2 | 17.6 | 3.9 | 18.0 | 12.4 | Red Brown |
| 10 | 41.1 | 15.4 | −2.1 | 15.5 | 352.2 | Violet |
| 11 | 39.0 | 13.9 | −7.6 | 15.8 | 331.2 | Violet |
| 12 | 36.6 | 12.1 | −14.2 | 18.6 | 310.5 | Violet |
| 13 | 34.6 | 10.5 | −15.6 | 18.8 | 303.9 | Violet |
| 14 | 30.5 | 9.2 | −15.6 | 18.1 | 300.6 | Violet |
| 15 | 30.4 | 8.8 | −16.6 | 18.8 | 297.8 | Violet |
| 16 | 28.7 | 8.2 | −16.7 | 18.6 | 296.0 | Violet |
| 17 | 27.4 | 7.6 | −16.6 | 18.3 | 294.5 | Violet |
| 18 | 26.8 | 7.1 | −16.5 | 17.9 | 293.3 | Violet |
| 19 | 47.4 | 30.5 | −2.9 | 30.6 | 354.6 | Magenta Red |
| 20 | 47.0 | 24.4 | −4.1 | 24.8 | 350.4 | Red Violet |
| 21 | 43.2 | 19.9 | −4.6 | 20.4 | 347.1 | Red Violet |
| 22 | 42.4 | 16.2 | −3.7 | 16.6 | 347.2 | Red Violet |
| 23 | 40.9 | 13.5 | −3.4 | 13.9 | 345.7 | Red Violet |
| 24 | 39.2 | 11.1 | −4.4 | 11.9 | 338.5 | Red Violet |
| 25 | 37.0 | 9.0 | −3.9 | 9.8 | 336.7 | Red Violet |
| 26 | 36.5 | 7.6 | −4.0 | 8.5 | 332.2 | Red Violet |
| 27 | 35.5 | 6.5 | −4.1 | 7.6 | 327.7 | Red Violet |
| 28 | 35.5 | 5.1 | −4.1 | 6.5 | 321.1 | Red Violet |
| 29 | 53.8 | 14.2 | 1.7 | 14.3 | 6.7 | Magenta Red |
| 30 | 46.6 | 20.2 | 1.6 | 20.2 | 4.6 | Magenta Red |
| 31 | 44.7 | 20.2 | 3.7 | 20.6 | 10.4 | Magenta Red |
| 32 | 45.6 | 18.8 | 6.2 | 19.8 | 18.1 | Magenta Red |
| 33 | 45.7 | 17.2 | 8.2 | 19.0 | 25.7 | Magenta Red |
| 34 | 0.0 | 0.0 | 0.0 | 0.0 | 0.0 | Magenta Red |
| 35 | 48.1 | 22.9 | −0.2 | 22.9 | 359.5 | Magenta Red |
| 36 | 45.5 | 20.2 | 2.9 | 20.4 | 8.0 | Magenta Red |
| 37 | 46.6 | 20.5 | 4.7 | 21.1 | 12.8 | Magenta Red |
| 38 | 46.7 | 19.1 | 6.8 | 20.3 | 19.6 | Magenta Red |
| 39 | 67.8 | 9.6 | −5.0 | 10.8 | 332.7 | Magenta Red |
| 40 | 61.4 | 15.6 | −5.9 | 16.7 | 339.3 | Magenta Red |
| 41 | 57.2 | 20.7 | −6.1 | 21.6 | 343.6 | Magenta Red |
| 42 | 51.9 | 26.4 | −5.6 | 27.0 | 347.9 | Magenta Red |
| 43 | 50.7 | 28.0 | −5.7 | 28.6 | 348.6 | Magenta Red |
| 44 | 48.8 | 31.1 | −5.1 | 31.5 | 350.6 | Magenta Red |
| 45 | 46.7 | 34.5 | −4.2 | 34.7 | 353.1 | Magenta Red |
| 46 | 46.3 | 35.1 | −2.8 | 35.2 | 355.4 | Magenta Red |
| 47 | 46.3 | 33.6 | 0.4 | 33.6 | 0.7 | Magenta Red |
| 48 | 47.3 | 30.7 | 3.7 | 30.9 | 6.8 | Magenta Red |
| 49 | 68.7 | 10.9 | −4.9 | 12.0 | 335.7 | Magenta Red |
| 50 | 61.3 | 17.8 | −5.9 | 18.7 | 341.8 | Magenta Red |
| 51 | 55.5 | 23.9 | −5.6 | 24.5 | 346.8 | Magenta Red |
| 52 | 55.9 | 23.6 | −5.7 | 24.3 | 346.5 | Magenta Red |
| 53 | 48.8 | 31.8 | −4.6 | 32.1 | 351.9 | Magenta Red |
| 54 | 47.9 | 32.1 | −3.8 | 32.3 | 353.3 | Magenta Red |
| 55 | 45.9 | 31.4 | −2.7 | 31.6 | 355.1 | Magenta Red |
| 56 | 46.2 | 32.9 | −1.8 | 33.0 | 356.9 | Magenta Red |

TABLE 4-continued

CIE color values for Examples 1-194 measured as calcined powders in a cuvette with spectral reflectance excluded on a PerkinElmer Lambda 900 UV/Vis/NIR with D65 illuminant and a 10° Standard Observer.

| Example | L* | a* | b* | C* | h | Color Description |
|---|---|---|---|---|---|---|
| 57 | 46.2 | 31.6 | 0.3 | 31.6 | 0.5 | Magenta Red |
| 58 | 45.3 | 29.8 | 2.9 | 29.9 | 5.6 | Magenta Red |
| 59 | 40.1 | 15.5 | 3.9 | 16.0 | 14.2 | Magenta Red |
| 60 | 48.8 | 14.8 | 6.1 | 16.0 | 22.3 | Magenta Red |
| 61 | 43.9 | 13.5 | 3.0 | 13.8 | 12.4 | Magenta Red |
| 62 | 59.0 | 4.2 | 5.1 | 6.7 | 50.6 | Grey-Pink |
| 63 | 41.7 | 16.8 | 1.4 | 16.9 | 4.8 | Magenta Red |
| 64 | 49.1 | 12.0 | -1.4 | 12.1 | 353.6 | Light Magenta |
| 65 | 43.2 | 17.8 | 2.3 | 17.9 | 7.5 | Magenta Red |
| 66 | 46.8 | 11.1 | 9.1 | 14.4 | 39.4 | Red Brown |
| 67 | 45.5 | 14.1 | 2.1 | 14.3 | 8.6 | Tan Grey |
| 68 | 55.3 | 1.5 | 9.6 | 9.7 | 81.0 | Magenta Red |
| 69 | 39.0 | 8.6 | 5.2 | 10.1 | 31.2 | Red Brown |
| 70 | 53.0 | 14.9 | -4.4 | 15.6 | 343.4 | Light Magenta |
| 71 | 44.0 | 32.7 | -2.4 | 32.8 | 355.8 | Magenta Red |
| 72 | 42.1 | 27.0 | 0.3 | 27.0 | 0.6 | Magenta Red |
| 73 | 42.6 | 25.6 | 0.7 | 25.6 | 1.5 | Magenta Red |
| 74 | 45.0 | 29.7 | -4.2 | 30.0 | 351.9 | Magenta Red |
| 75 | 44.5 | 31.8 | -3.0 | 31.9 | 354.6 | Magenta Red |
| 76 | 43.6 | 26.4 | -0.9 | 26.4 | 358.1 | Magenta Red |
| 77 | 38.9 | 12.3 | 8.0 | 14.7 | 32.9 | Red Brown |
| 78 | 43.4 | 22.6 | 3.0 | 22.8 | 7.5 | Magenta |
| 79 | 32.0 | 8.3 | -15.1 | 17.2 | 298.9 | Red Violet |
| 80 | 28.2 | 6.3 | -15.4 | 16.6 | 292.2 | Red Violet |
| 81 | 29.9 | 4.9 | 5.9 | 7.7 | 50.1 | Dark Brown |
| 82 | 22.9 | 3.4 | 3.8 | 5.1 | 47.5 | Dark Brown |
| 83 | 22.9 | 1.0 | 0.0 | 1.0 | 2.3 | Black |
| 84 | 24.0 | 0.6 | -0.9 | 1.1 | 304.4 | Black |
| 85 | 48.4 | 24.8 | -1.8 | 24.9 | 356.0 | Magenta Red |
| 86 | 46.6 | 33.9 | -3.5 | 34.1 | 354.2 | Magenta Red |
| 87 | 47.1 | 34.8 | -2.8 | 34.9 | 355.3 | Magenta Red |
| 88 | 47.8 | 34.0 | -0.8 | 34.0 | 358.7 | Magenta Red |
| 89 | 47.4 | 25.2 | 3.7 | 25.5 | 8.3 | Magenta Red |
| 90 | 52.7 | 28.6 | -5.6 | 29.2 | 349.0 | Magenta Red |
| 91 | 55.5 | 24.5 | -5.7 | 25.2 | 346.9 | Magenta Red |
| 92 | 54.7 | 26.1 | -5.3 | 26.7 | 348.5 | Magenta Red |
| 93 | 61.2 | 19.1 | -4.7 | 19.7 | 346.3 | Magenta Red |
| 94 | 54.4 | 27.4 | -5.2 | 27.9 | 349.2 | Magenta Red |
| 95 | 53.4 | 27.8 | -4.7 | 28.2 | 350.3 | Magenta Red |
| 96 | 53.4 | 28.9 | -4.5 | 29.2 | 351.2 | Magenta Red |
| 97 | 46.8 | 27.2 | -1.4 | 27.3 | 357.1 | Red Violet |
| 98 | 39.9 | 20.4 | -5.9 | 21.2 | 344.0 | Red Violet |
| 99 | 38.0 | 15.1 | -7.7 | 16.9 | 332.9 | Red Violet |
| 100 | 36.1 | 11.5 | -8.1 | 14.1 | 324.9 | Red Violet |
| 101 | 36.6 | 7.4 | -9.1 | 11.7 | 309.2 | Red Violet |
| 102 | 31.3 | 6.8 | -8.3 | 10.7 | 309.4 | Red Violet |
| 103 | 34.1 | 5.1 | -8.4 | 9.8 | 301.2 | Red Violet |
| 104 | 31.9 | 4.8 | -7.9 | 9.2 | 301.2 | Red Violet |
| 105 | 33.1 | 3.6 | -7.3 | 8.1 | 296.1 | Red Violet |
| 106 | 43.1 | 37.1 | -3.3 | 37.3 | 354.9 | Red Violet |
| 107 | 43.1 | 26.3 | -1.2 | 26.4 | 357.4 | Red Violet |
| 108 | 41.9 | 20.0 | -0.9 | 20.0 | 357.5 | Red Violet |
| 109 | 38.4 | 13.4 | -1.0 | 13.5 | 355.6 | Red Violet |
| 110 | 37.4 | 9.8 | -2.1 | 10.1 | 347.7 | Red Violet |
| 111 | 35.1 | 8.0 | -2.9 | 8.5 | 339.9 | Red Violet |
| 112 | 34.0 | 7.0 | -4.3 | 8.2 | 328.2 | Red Violet |
| 113 | 31.5 | 5.0 | -6.9 | 8.5 | 305.9 | Red Violet |
| 114 | 32.4 | 4.9 | -5.8 | 7.6 | 310.3 | Red Violet |
| 115 | 38.3 | 21.9 | 2.6 | 22.1 | 6.7 | Red Violet |
| 116 | 39.3 | 14.9 | 1.4 | 15.0 | 5.3 | Red Violet |
| 117 | 38.6 | 12.1 | -2.2 | 12.3 | 349.9 | Red Violet |
| 118 | 36.7 | 9.2 | -4.9 | 10.4 | 332.0 | Red Violet |
| 119 | 34.5 | 7.2 | -6.0 | 9.4 | 320.2 | Red Violet |
| 120 | 33.1 | 6.0 | -7.2 | 9.4 | 310.1 | Red Violet |
| 121 | 31.7 | 5.8 | -8.2 | 10.1 | 305.3 | Red Violet |
| 122 | 30.7 | 5.0 | -8.7 | 10.0 | 300.0 | Red Violet |
| 123 | 29.4 | 4.7 | -9.6 | 10.7 | 296.2 | Red Violet |
| 124 | 39.9 | 20.6 | 4.7 | 21.1 | 12.9 | Red Violet |
| 125 | 38.2 | 16.9 | -0.5 | 16.9 | 358.2 | Red Violet |
| 126 | 35.9 | 14.5 | -7.2 | 16.2 | 333.5 | Red Violet |
| 127 | 33.4 | 11.3 | -10.4 | 15.3 | 317.4 | Red Violet |
| 128 | 30.2 | 9.2 | -12.3 | 15.4 | 306.6 | Red Violet |
| 129 | 28.8 | 7.8 | -12.8 | 15.0 | 301.3 | Red Violet |
| 130 | 28.0 | 7.4 | -13.5 | 15.4 | 298.7 | Red Violet |
| 131 | 26.4 | 6.5 | -13.4 | 14.9 | 295.7 | Red Violet |
| 132 | 26.8 | 6.5 | -14.3 | 15.7 | 294.4 | Red Violet |
| 133 | 41.4 | 19.7 | 5.1 | 20.4 | 14.5 | Red Violet |
| 134 | 38.7 | 15.8 | 1.0 | 15.8 | 3.5 | Red Violet |
| 135 | 36.4 | 12.1 | -4.1 | 12.8 | 341.2 | Red Violet |
| 136 | 33.3 | 11.4 | -10.6 | 15.6 | 316.9 | Red Violet |
| 137 | 31.4 | 9.1 | -13.0 | 15.9 | 305.2 | Red Violet |
| 138 | 30.4 | 8.3 | -13.7 | 16.0 | 301.2 | Red Violet |
| 139 | 29.4 | 7.3 | -13.9 | 15.7 | 297.8 | Red Violet |
| 140 | 27.8 | 6.7 | -14.0 | 15.5 | 295.6 | Red Violet |
| 141 | 27.6 | 6.4 | -14.6 | 15.9 | 293.8 | Red Violet |
| 142 | 45.4 | 34.7 | -3.7 | 34.9 | 353.8 | Red Violet |
| 143 | 48.0 | 32.1 | 0.2 | 32.1 | 0.3 | Red Violet |
| 144 | 45.8 | 31.7 | 1.9 | 31.7 | 3.5 | Red Violet |
| 145 | 46.5 | 30.2 | 5.3 | 30.7 | 9.9 | Red Violet |
| 146 | 47.5 | 30.9 | 5.3 | 31.3 | 9.7 | Red Violet |
| 147 | 50.4 | 29.4 | 6.1 | 30.0 | 11.7 | Red Violet |
| 148 | 48.6 | 29.0 | 8.3 | 30.1 | 16.0 | Red Violet |
| 149 | 48.9 | 27.0 | 12.4 | 29.7 | 24.7 | Red Violet |
| 150 | 49.1 | 26.5 | 13.8 | 29.9 | 27.5 | Red Violet |
| 160 | 47.1 | 35.4 | -4.1 | 35.7 | 353.4 | Magenta Red |
| 161 | 47.2 | 35.6 | -3.5 | 35.8 | 354.4 | Magenta Red |
| 162 | 46.4 | 36.7 | -3.7 | 36.9 | 354.3 | Magenta Red |
| 163 | 46.0 | 36.6 | -2.3 | 36.6 | 356.4 | Magenta Red |
| 164 | 46.0 | 37.1 | -2.6 | 37.2 | 356.0 | Magenta Red |
| 165 | 45.3 | 35.5 | -1.6 | 35.5 | 357.5 | Magenta Red |
| 166 | 46.0 | 36.8 | -2.4 | 36.8 | 356.3 | Magenta Red |
| 167 | 48.1 | 35.0 | -3.4 | 35.2 | 354.5 | Magenta Red |
| 168 | 51.4 | 32.9 | -4.5 | 33.3 | 352.2 | Magenta Red |
| 169 | 44.1 | 34.8 | -3.0 | 35.0 | 355.2 | Magenta Red |
| 170 | 45.6 | 35.3 | -3.3 | 35.4 | 354.7 | Magenta Red |
| 171 | 43.7 | 32.7 | -1.2 | 32.8 | 358.0 | Magenta Red |
| 172 | 41.6 | 22.9 | 4.2 | 23.2 | 10.3 | Magenta Red |
| 173 | 46.1 | 32.2 | 1.4 | 32.2 | 2.4 | Magenta Red |
| 174 | 45.8 | 26.8 | 5.3 | 27.3 | 11.2 | Magenta Red |
| 175 | 45.2 | 25.9 | 7.2 | 26.9 | 15.5 | Magenta Red |
| 176 | 46.4 | 15.7 | 12.0 | 19.8 | 37.5 | Red Yellow |
| 177 | 50.7 | 15.7 | 13.2 | 20.5 | 40.0 | Red Yellow |
| 178 | 35.7 | 23.2 | 1.8 | 23.3 | 4.4 | Red Yellow |
| 179 | 43.1 | 20.8 | 14.9 | 25.6 | 35.6 | Red Yellow |
| 180 | 44.9 | 20.9 | 17.5 | 27.3 | 40.0 | Red Yellow |
| 181 | 41.8 | 22.3 | 10.0 | 24.5 | 24.2 | Red Yellow |
| 182 | 46.1 | 22.8 | 11.2 | 25.4 | 26.3 | Red Yellow |
| 183 | 41.1 | 20.8 | 12.8 | 24.4 | 31.6 | Red Yellow |
| 184 | 41.3 | 19.3 | 14.7 | 24.2 | 37.3 | Red Yellow |
| 185 | 45.0 | 21.3 | 15.9 | 26.5 | 36.7 | Red Yellow |
| 186 | 46.4 | 18.8 | 21.0 | 28.2 | 48.2 | Red Yellow |
| 187 | 39.4 | 30.0 | -1.2 | 30.0 | 357.7 | Magenta Red |
| 188 | 40.9 | 32.9 | -3.9 | 33.1 | 353.3 | Magenta Red |
| 189 | 44.2 | 29.1 | -4.1 | 29.4 | 352.0 | Magenta Red |
| 190 | 45.3 | 33.6 | -4.0 | 30.2 | 348.7 | Magenta Red |
| 191 | 53.0 | 29.6 | -5.9 | 33.8 | 353.2 | Magenta Red |
| 192 | 46.0 | 34.5 | -5.7 | 32.5 | 347.4 | Magenta Red |
| 193 | 52.5 | 31.7 | -7.1 | 35.0 | 350.6 | Magenta Red |
| 194 | 56.0 | 33.1 | -3.3 | 33.3 | 354.3 | Magenta Red |

X-ray Powder diffraction Data: X-ray powder diffraction measurements were made at room temperature using a Rigaku X-ray diffractometer with Cu-Kα radiation at 40 kV and 40 mA from 10° to 75° at 1°/min. Powder diffraction measurements were made for Examples 1-8. The dominant structure exhibited for Examples 1-8 was the expected hexagonal $YInO_4$ identified by comparing peaks with the $YInO_3$ pattern. Trace phases included $Y_2TiO_5$, $YTiO_3$, and cobalt metal. Table 3 indicates the observed phase composition for Examples 1-8.

TABLE 5

X-ray Powder Diffraction phase composition for Examples 1-8

| | XRD Observed Phases | | | | |
|---|---|---|---|---|---|
| | $YInO_3$ | $Y_2TiO_5$ | $YTiO_3$ | CO | $Y_2O_3$ |
| Example 1 | Major | | | | |
| Example 2 | Major | | | | |
| Example 3 | Major | | | | |
| Example 4 | Major | Trace | | | |
| Example 5 | Major | | Trace | | |
| Example 6 | Major | Trace | | | |
| Example 7 | Major | | | | Minor |
| Example 8 | Major | | | Trace | Minor |

Glass application. For bismuth based fluxes: Pigment was combined with a bismuth-based flux at a loading of 15-20%. Water miscible solvent was added until viscosity was between 18-20,000 cP. Films were printed via applicator with a 5 mil wet film thickness, were dried, and then fired between 537° C. and 704° C. for several minutes until the enamel was no longer porous on 6 mm clear glass.

TABLE 6

CIE color values for Examples 79, 80, 190-194 in a bismuth, low iron glass enamel.

| Example | Pigment Load | Shade | Glass type | L* | a* | b* | Gloss | Optical Density | Opacity |
|---|---|---|---|---|---|---|---|---|---|
| Cadmium Red | 15% | Red | Bismuth-Low Iron | 24.5 | 42.0 | 29.6 | 19.4 | 2.1 | 99.3% |
| Fe2O3/CoAl2O4 | 20% | Purple | Bismuth-Low Iron | 5.1 | 5.8 | −9.6 | 77.7 | 1.9 | 98.7% |
| Au—bearing | 20% | Purple | Bismuth-Low Iron | 7.9 | 18.0 | 3.7 | 35.6 | 1.4 | 96.4% |
| 79 | 20% | Violet | Bismuth-Low Iron | 9.6 | 4.3 | −10.5 | 73.5 | 2.2 | 99.3% |
| 80 | 20% | Violet | Bismuth-Low Iron | 6.0 | 3.9 | −12.1 | 50.4 | 2.6 | 99.8% |
| 190 | 15% | Magenta | Bismuth-Low Iron | 29.6 | 26.2 | −4.4 | 72.9 | 0.7 | 81.0% |
| 191 | 15% | Magenta | Bismuth-Low Iron | 27.5 | 28.1 | −5.4 | 74.1 | 0.9 | 87.1% |
| 191 | 20% | Magenta | Bismuth-Low Iron | 18.6 | 20.5 | −7.0 | 76.2 | 1.2 | 92.9% |
| 192 | 15% | Magenta | Bismuth-Low Iron | 31.1 | 28.2 | −5.9 | 71.2 | 0.7 | 80.1% |
| 193 | 15% | Magenta | Bismuth-Low Iron | 27.6 | 31.0 | −6.3 | 76.7 | 0.9 | 88.0% |
| 193 | 20% | Magenta | Bismuth-Low Iron | 19.0 | 23.7 | −7.4 | 77.7 | 1.3 | 95.1% |
| 194 | 20% | Magenta | Bismuth-Low Iron | 21.9 | 26.5 | −5.9 | 78.8 | 1.1 | 92.6% |

What is claimed:

1. An $ABO_3$ material having a formula $A(M,M')O_3$
   wherein A is Y, or mixtures of Y with La, Sc, Gd, Tb, Dy, Ho, Er, Tm, Yb or Lu;
   wherein M=In, or mixtures In with Al, Ga, Cr, Fe, Ni, B or Mn;
   wherein M' is a mixture of $M_A$ and $M_B$ cations;
   wherein $M_A$=Co, or mixtures of Co with Zn, Mg, Ca, Sr, Ba, Cu or Ni;
   wherein $M_B$=Ti, Zr- or Sn, or mixtures of Ti, Zr or Sn with Si, V, Sb, Nb, Mo, W, Ta or Bi;
   and
   wherein cations are present in proportions close to those for making an electrically neutral oxide with a hexagonal crystal structure.

2. The material of claim 1 wherein the formulas are selected from:
   $YIn_{1-x}(Co_{0.5}Ti_{0.5})_xO_3$
   $YIn_{1-x}((Co,Zn)_{0.5}Ti_{0.5})xO_3$
   wherein $0.01<x\leq0.60$.

3. The material of claim 1, where M and M' are in a trigonal bipyramidal B site of the $ABO_3$ structure.

4. The material of claim 1, where M' is a mixture containing $Co^{2+}$ and wherein cations are present in proportions close to those for making the electrically neutral oxide with a hexagonal crystal structure.

5. The material of claim 1, which is a red-shade violet pigment having a hexagonal $ABO_3$ structure of the form $Y(In, M')O_3$.

6. The material of claim 1, where M is In in a trigonal bipyramidal B site of the $A(M,M')O_3$ structure.

7. The material of claim 1 for use as a pigment in paint, ink, glass, enamel, glaze, plastic or decorative cosmetic.

8. A method of preparing the material of claim 1, which comprises a step of heating a reaction mixture under vacuum, in air, or in an inert atmosphere comprising nitrogen, argon, and a mixture thereof.

9. The method of claim 8, which comprises the step of treating the reaction mixture with a reducing substance selected from silicon, silicon monoxide, carbon, antimony (III) oxide, and cobalt metal.

10. The method of claim 8, wherein the reaction mixture comprises one or more mineralizers including, but not limited to, alkali and alkaline earth metal salts, for example metal hydroxides, halides, carbonates, sulfates, and phosphates, metal oxides such as molybdenum, tungsten, vanadium, and bismuth oxides, and boron oxides such as boric acid, boron oxide, or sodium tetraborate.

11. The material of claim 1 wherein the formulas are selected from:
   $YCo_{0.20}Ti_{0.20}In_{0.60}O_3$, and
   $YCo_xTi_xIn_{1-2x}O_3$.

* * * * *